(12) United States Patent
Hubert et al.

(10) Patent No.: US 11,846,825 B2
(45) Date of Patent: Dec. 19, 2023

(54) INTERLOCK ARRANGEMENT FOR ATTACHING A LENS BARREL TO A LENS CARRIER

(71) Applicant: Apple Inc., Cupertino, CA (US)

(72) Inventors: Aurelien R. Hubert, Saratoga, CA (US); Qiang Yang, Fremont, CA (US); Yoshiyuki Takase, Tokyo (JP)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 17/200,560

(22) Filed: Mar. 12, 2021

(65) Prior Publication Data

US 2021/0199913 A1 Jul. 1, 2021

Related U.S. Application Data

(63) Continuation of application No. 16/723,730, filed on Dec. 20, 2019, now Pat. No. 10,948,685, which is a
(Continued)

(51) Int. Cl.

| | |
|---|---|
| *G02B 7/02* | (2021.01) |
| *H04N 23/55* | (2023.01) |
| *G03B 5/00* | (2021.01) |
| *G03B 17/02* | (2021.01) |
| *H04N 23/57* | (2023.01) |
| *H04N 23/68* | (2023.01) |

(Continued)

(52) U.S. Cl.
CPC .......... *G02B 7/022* (2013.01); *G03B 17/02* (2013.01); *H04N 23/55* (2023.01); *H04N 23/57* (2023.01); *H04N 23/687* (2023.01); *G02B 7/025* (2013.01); *G02B 7/08* (2013.01); *G03B 3/00* (2013.01); *G03B 5/00* (2013.01); *G03B 13/36* (2013.01); *G03B 2205/0007* (2013.01); *G03B 2205/0069* (2013.01); *H04N 23/63* (2023.01); *H04N 23/631* (2023.01)

(58) Field of Classification Search
CPC ...................................................... G02B 7/022
USPC .......................................................... 348/360
See application file for complete search history.

(56) References Cited

U.S. PATENT DOCUMENTS 10,534,154 B2   1/2020   Hubert et al.
10,690,934 B2 *  6/2020  Hu .......................... G02B 7/02
(Continued)

*Primary Examiner* — Joel W Fosselman
(74) *Attorney, Agent, or Firm* — Robert C. Kowert; Kowert, Hood, Munyon, Rankin & Goetzel, P.C.

(57) ABSTRACT

Various embodiments include an interlock arrangement that may be used to attach a lens barrel to a lens carrier of a camera. In some embodiments, the interlock arrangement may restrict movement of the lens barrel relative to the lens carrier along at least an optical axis. In various examples, the interlock arrangement may include one or more grooves and one or more protrusions. For instance, a groove may be defined by the lens barrel or the lens carrier, and a protrusion may extend from the lens barrel or the lens carrier to at least partially into the groove. In some cases, the interlock arrangement may include an adhesive that at least partially fills gaps within the interlock arrangement between the lens barrel and the lens carrier. According to some embodiments, the interlock arrangement may include one or more recesses that provide inlets for the adhesive to be introduced to the gaps within the interlock arrangement.

19 Claims, 14 Drawing Sheets

Related U.S. Application Data continuation of application No. 15/979,765, filed on May 15, 2018, now Pat. No. 10,534,154.

(60) Provisional application No. 62/521,196, filed on Jun. 16, 2017.

(51) Int. Cl.
   *G03B 13/36*   (2021.01)
   *G03B 3/00*    (2021.01)
   *G02B 7/08*    (2021.01)
   *H04N 23/63*   (2023.01)

(56) References Cited

U.S. PATENT DOCUMENTS

| | | | |
|---|---|---|---|
| 10,948,685 B2 | 3/2021 | Hubert et al. | |
| 2016/0070115 A1* | 3/2016 | Miller | G03B 5/02 |
| | | | 359/557 |
| 2018/0348471 A1* | 12/2018 | Lin | G02B 7/022 |
| 2019/0141248 A1* | 5/2019 | Hubert | H04N 5/23287 |

\* cited by examiner

INTERLOCK ARRANGEMENT FOR ATTACHING A LENS BARREL TO A LENS CARRIER

This application is a continuation of U.S. patent application Ser. No. 16/723,730, filed Dec. 20, 2019, which is a continuation of U.S. patent application Ser. No. 15/979,765, filed May 15, 2018, now U.S. Pat. No. 10,534,154, which claims benefit of priority to U.S. Provisional Patent Application Ser. No. 62/521,196 filed on Jun. 16, 2017, which are incorporated herein by reference in their entirety.

BACKGROUND

Technical Field

This disclosure relates generally to an interlock arrangement for attaching a lens barrel to a lens carrier of a camera.

Description of the Related Art

The advent of small, mobile multipurpose devices such as smartphones and tablet or pad devices has resulted in a need for high-resolution, small form factor cameras for integration in the devices. Some small form factor cameras may include a lens barrel that is threaded so that it can be fastened to another camera component. Furthermore, some small form factor cameras may include a lens barrel that is bonded to another camera component using an adhesive. In some such designs, the bond between the lens barrel and the other camera component may be fragile due to the adhesive being primarily in tension and/or shear under certain circumstances (e.g., a drop event), and therefore the lens barrel may tend to detach from the other camera component.

Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera.

SUMMARY OF EMBODIMENTS

A device may include a lens barrel and a lens carrier. The lens barrel may hold one or more lens elements that define an optical axis. The lens carrier may be attached to the lens barrel at least partially via an interlock arrangement. In some instances, the interlock arrangement may restrict movement of the lens barrel relative to the lens carrier along at least the optical axis.

According to some examples, the interlock arrangement may include a groove and a protrusion. The groove may be defined by the lens barrel or the lens carrier. The protrusion may extend from the lens barrel or the lens carrier to at least partially into the groove. Furthermore, the interlock arrangement may include an adhesive. The adhesive may at least partially fill gaps within the interlock arrangement between the lens barrel and the lens carrier. In some embodiments, the interlock arrangement may include a recess defined by the lens barrel and/or the lens carrier. The recess may provide an inlet for the adhesive to be introduced to the gaps within the interlock arrangement between the lens barrel and the lens carrier. According to some embodiments, the interlock arrangement may be configured such that, when the adhesive is introduced via the recess, the adhesive travels via capillary effect to at least partially fill the gaps within the interlock arrangement between the lens barrel and the lens carrier.

In some examples, at least a first portion of the adhesive may be in compression when force is applied to the lens barrel in a first direction. For example, the first direction may be parallel to the optical axis. Additionally, or alternatively, at least a second portion of the adhesive may be in compression when force is applied to the lens barrel in a second direction. For instance, the second direction may be opposite the first direction.

Some embodiments include a camera module. The camera module may include one or more lens elements that define an optical axis, a lens barrel that holds the lens elements, a lens carrier, and an interlock arrangement to attach the lens barrel to the lens carrier. According to various embodiments, the interlock arrangement may include one or more grooves, one or more protrusions, and an adhesive. The grooves may be defined by the lens barrel and/or the lens carrier. The protrusions may extend from the lens barrel and/or the lens carrier. For example, each respective protrusion may extend at least partially into a respective groove. The adhesive may at least partially fill gaps within the interlock arrangement between the lens barrel and the lens carrier. In various embodiments, one or more portions of the adhesive may be in compression when force is applied to the lens barrel in directions parallel to the optical axis.

In some examples, the interlock arrangement may include one or more recesses defined by the lens barrel. For instance, each of the recesses may provide a respective inlet for the adhesive to be introduced to the gaps within the interlock arrangement. In some embodiments, when the adhesive is introduced via the recesses, the adhesive may travel via capillary effect to at least partially fill the gaps within the interlock arrangement between the lens barrel and the lens carrier.

Some embodiments include a method of assembling a camera module having an interlock arrangement. The method may include inserting a lens barrel at least partially into a lens carrier such that a protrusion of the interlock arrangement extends from the lens barrel or the lens carrier to at least partially into a first portion of a groove of the interlock arrangement. The groove may be defined by the lens barrel or the lens carrier. In some cases, the method may include rotating the lens barrel about an optical axis defined by one or more lens elements held by the lens barrel, such that the protrusion extends at least partially into a second portion of the groove. Furthermore, the method may include dispensing an adhesive into a recess that is formed on the lens barrel to provide an inlet for the adhesive to be introduced to the interlock arrangement. For instance, the adhesive may be dispensed into the recess such that the adhesive travels to at least partially fill gaps within the interlock arrangement between the lens barrel and the lens carrier.

BRIEF DESCRIPTION OF THE DRAWINGS

FIG. 4A shows a perspective view of the lens barrel. FIG. 4B shows a top view of the lens barrel.

FIG. 8A shows a perspective view of the lens barrel. FIG. 8B shows a top view of the lens barrel.

Figure 1:
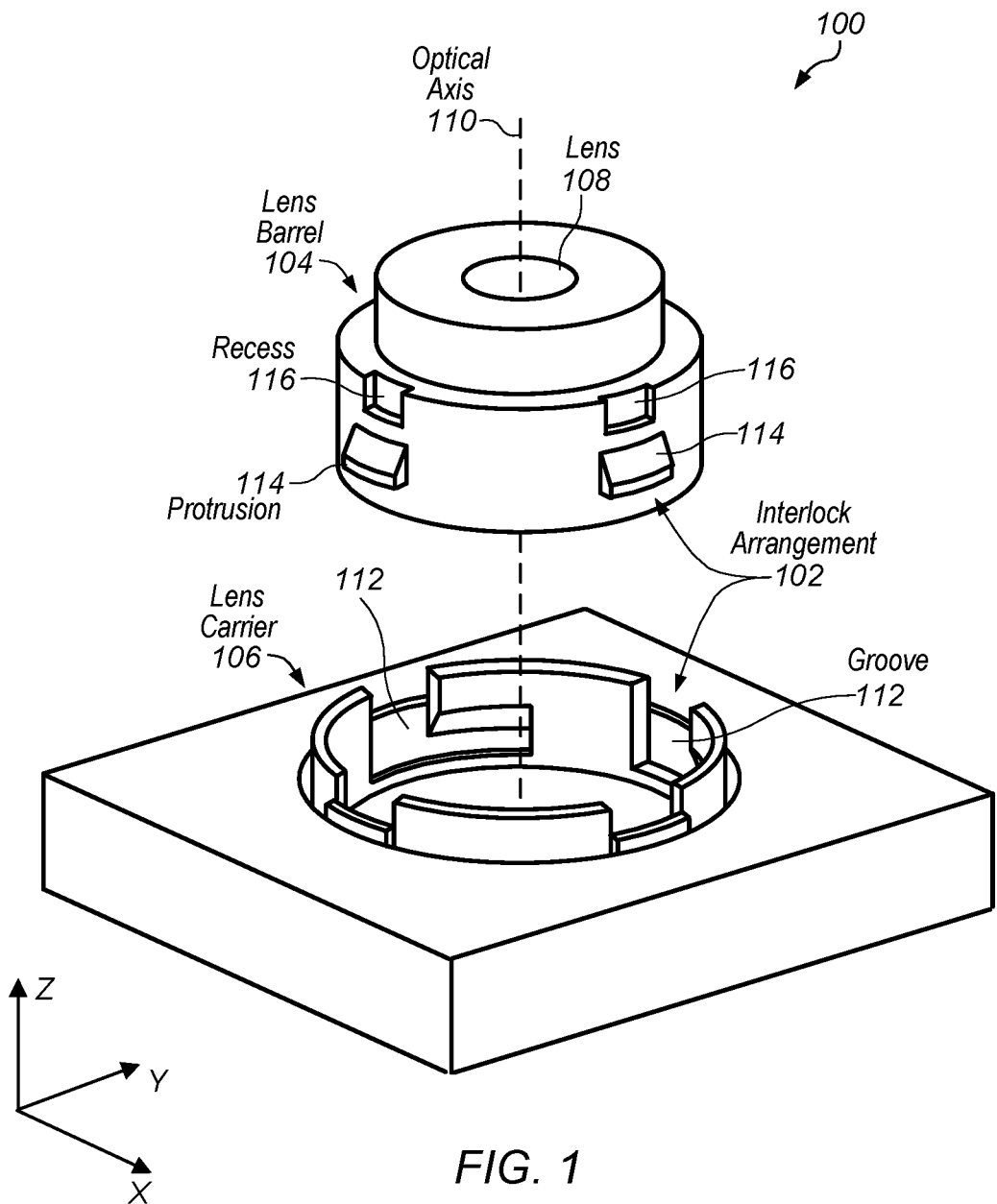
FIG. 1 illustrates a perspective view of an example camera module that includes an example interlock arrangement for attaching a lens barrel to a lens carrier, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include camera equipment outfitted with an interlock arrangement that may be used to attach a lens barrel to a lens carrier. In various examples, the lens barrel and/or the lens carrier may be threadless, e.g., the lens barrel and the lens carrier may not have a matching pair of male-female threads.

In some embodiments, a device may include a lens barrel and a lens carrier. The lens barrel may hold one or more lens elements that define an optical axis. The lens carrier may be attached to the lens barrel at least partially via an interlock arrangement. In some instances, the interlock arrangement may restrict movement of the lens barrel relative to the lens carrier along at least the optical axis.

According to some examples, the interlock arrangement may include a groove and a protrusion. As used herein, the term "groove" may refer to a channel that is sized such that the protrusion may fit at least partially into the channel and move along the channel when the lens barrel is inserted into the lens carrier. As used herein, the term "recess" may refer to an opening that is sized and positioned such that when the lens barrel is in a certain position within the lens carrier, a channel is formed such that adhesive may be introduced into a groove through the channel, but the channel is sized such that the protrusion cannot pass through the channel.

The groove may be defined by the lens barrel or the lens carrier. The protrusion may extend from the lens barrel or the lens carrier to at least partially into the groove. For instance, the protrusion may extend towards the groove in a direction that is orthogonal to the optical axis. In some cases, the groove may be an L-shaped groove formed circumferentially along an outer periphery of the lens barrel or an inner periphery of the lens carrier.

Furthermore, the interlock arrangement may include an adhesive. The adhesive may at least partially fill gaps within the interlock arrangement between the lens barrel and the lens carrier. In some embodiments, the interlock arrangement may include a recess defined by the lens barrel and/or the lens carrier. The recess may provide an inlet for the adhesive to be introduced to the gaps within the interlock arrangement between the lens barrel and the lens carrier. According to some embodiments, the interlock arrangement may be configured such that, when the adhesive is introduced via the recess, the adhesive travels via capillary effect to at least partially fill the gaps within the interlock arrangement between the lens barrel and the lens carrier. For instance, the interlock arrangement may form a channel between the lens barrel and the lens carrier that is sized such that, when the adhesive is introduced via the recess, the adhesive traverses the channel via capillary effect to at least partially fill the gaps within the interlock arrangement between the lens barrel and the lens carrier.

In some examples, at least a first portion of the adhesive may be in compression when force is applied to the lens barrel in a first direction. For example, the first direction may be parallel to the optical axis. Additionally, or alternatively, at least a second portion of the adhesive may be in compression when force is applied to the lens barrel in a second direction. For instance, the second direction may be opposite the first direction.

In some cases, the interlock arrangement may include multiple grooves and multiple protrusions. For instance, the interlock arrangement may include a first groove defined by the lens barrel or the lens carrier, and another groove defined by the lens barrel or the lens carrier. When the lens barrel is attached to the lens carrier via the interlock arrangement, the first groove and the second groove may be opposite one another with respect to the lens barrel. Furthermore, the interlock arrangement may include a first protrusion that extends from the lens barrel or the lens carrier to at least partially into the first groove, and a second protrusion that extends from the lens barrel or the lens carrier to at least partially into the second groove. When the lens barrel is attached to the lens carrier via the interlock arrangement, the first protrusion and the second protrusion may be opposite one another with respect to the lens barrel.

In some embodiments, the device may be a mobile device (e.g., a mobile multifunction device). The mobile device may include a camera module. The lens barrel, the lens carrier, and the interlock arrangement may be part of the camera module. The camera module may further include an image sensor configured to capture light passing through the lens elements and convert the captured light into image signals. Furthermore, the camera module may include a lens actuator to move the lens carrier relative to the image sensor (and/or to move the image sensor relative to the lens carrier). The mobile device may further include a display and one or more processors in some embodiments.

In some cases, the processors may be configured to cause the lens actuator (e.g., a voice coil motor (VCM) actuator, a microelectromechanical systems (MEMS) actuator, etc.) to move the lens carrier relative to the image sensor and/or to move the image sensor relative to the lens carrier, e.g., to provide autofocus and/or optical image stabilization functionality. In some examples, the processors may be configured to cause the display to present an image based at least in part on one or more image signals from the image sensor.

In some embodiments, a camera module may include one or more elements that define an optical axis, a lens barrel that holds the one or more lens elements, a lens carrier, and an interlock arrangement to attach the lens barrel to the lens carrier. According to various embodiments, the interlock arrangement may include one or more grooves, one or more protrusions, and an adhesive. The grooves may be defined by the lens barrel and/or the lens carrier. The protrusions may extend from the lens barrel and/or the lens carrier. For example, each respective protrusion may extend at least partially into a respective groove. The adhesive may at least partially fill gaps within the interlock arrangement between the lens barrel and the lens carrier. In various embodiments, one or more portions of the adhesive may be in compression when force is applied to the lens barrel in directions parallel to the optical axis.

In some examples, the interlock arrangement may include one or more recesses defined by the lens barrel. For instance, each of the recesses may provide a respective inlet for the adhesive to be introduced to the gaps within the interlock arrangement. In some embodiments, when the adhesive is introduced via the recesses, the adhesive may travel via capillary effect to at least partially fill the gaps within the interlock arrangement between the lens barrel and the lens carrier. For instance, the interlock arrangement may form one or more channels between the lens barrel and the lens carrier. The channel may be sized such that, when the adhesive is introduced via the recesses, the adhesive traverses the channels via capillary effect to at least partially fill the gaps within the interlock arrangement between the lens barrel and the lens carrier. In various embodiments, the channel may include one or more of the gaps within the interlock arrangement.

In some cases, at least a first portion of the adhesive may be in compression when force is applied to the lens barrel in a first direction that is parallel to the optical axis. Additionally, or alternatively, at least a second portion of the adhesive may be in compression when force is applied to the lens barrel in a second direction that is opposite the first direction.

According to some examples, the grooves may include a first groove defined by the lens carrier. The protrusions may include a first protrusion that extends from the lens barrel to at least partially into the first groove. The interlock arrangement may include a first recess defined by the lens barrel and/or the lens carrier, and located proximate the first protrusion. For instance, the first recess may be located above the first protrusion. The first recess may provide a first inlet for the adhesive to be introduced to gaps within the interlock arrangement between surfaces of the first groove and the first protrusion. In some cases, the grooves may include a second groove defined by the lens carrier. The protrusions may include a second protrusion that extends from the lens barrel to at least partially into the second groove. The second protrusion may be opposite the first protrusion with respect to the lens barrel in some cases. Furthermore, the interlock arrangement may include a second recess defined by the lens barrel and/or the lens carrier, and located proximate the second protrusion. For instance, the second recess may be located above the second protrusion. The second recess may provide a second inlet for the adhesive to be introduced to gaps within the interlock arrangement between surfaces of the second groove and the second protrusion.

In some embodiments, the grooves may include a first groove defined by the lens barrel. The protrusions may include a first protrusion that extends from the lens carrier to at least partially into the first groove. The interlock arrangement may include a shoulder that extends from the lens barrel, e.g., along a plane orthogonal to the optical axis. In some examples, the shoulder may be a portion of the lens barrel that extends to overlap a portion of the lens carrier. In some instances, the shoulder may limit the amount the lens barrel may be inserted into the lens carrier. The shoulder may define a first recess located proximate the first groove. For instance, the first recess may be located above the first groove. The first recess may provide a first inlet for the adhesive to be introduced to gaps within the interlock arrangement between surfaces of the first groove and the first protrusion. In some cases, the grooves may include a second groove defined by the lens barrel. The protrusions may include a second protrusion that extends from the lens carrier to at least partially into the second groove. The second protrusion may be opposite the first protrusion with respect to the lens barrel in some instances. Furthermore, the interlock arrangement may include a second recess defined by the shoulder and located proximate the second groove. For instance, the second recess may be located above the second groove. The second recess may provide a second inlet for the adhesive to be introduced to gaps within the interlock arrangement between surfaces of the second groove and the second protrusion.

Some embodiments include a method of assembling a camera module having an interlock arrangement. The method may include inserting a lens barrel at least partially into a lens carrier such that a protrusion of the interlock arrangement extends from the lens barrel or the lens carrier to at least partially into a first portion of a groove of the interlock arrangement. The groove may be defined by the lens barrel or the lens carrier. In some cases, the method may include rotating the lens barrel about an optical axis defined by one or more lens elements held by the lens barrel, such that the protrusion extends at least partially into a second portion of the groove. Furthermore, the method may include dispensing an adhesive into a recess that is formed on the lens barrel to provide an inlet for the adhesive to be introduced to the interlock arrangement. For instance, the adhesive may be dispensed into the recess such that the adhesive travels to at least partially fill gaps within the interlock arrangement between the lens barrel and the lens carrier.

In some embodiments, dispensing the adhesive into the recess may include filling, with a first portion of the adhesive, a first gap between a first surface of the protrusion and a first surface of the groove. For example, the first gap may be filled with the first portion of the adhesive via capillary effect. In some cases, the first portion of the adhesive may be in compression when force is applied to the lens barrel in at least a first direction. For instance, the first direction may be parallel to the optical axis. Additionally, or alternatively, dispensing the adhesive into the recess may include filling, with a second portion of the adhesive, a second gap between the lens barrel and the groove. For example, the second gap may be filled with the second portion of the adhesive via capillary effect. In some cases, the second portion of the adhesive may be in compression when force is applied to the lens barrel in at least a second direction. For instance, the second direction may be opposite the first direction.

According to some embodiments, the method may include adjusting a position of the lens barrel relative to an image sensor. For instance, the position of the lens barrel may be adjusted to orient the lens elements in an aligned position in which the lens elements are optically aligned with the image sensor. In some implementations, the position of the lens barrel may be adjusted during a time period that occurs after rotating the lens barrel. Furthermore, in some implementations, the method may include curing the adhesive to bond the lens barrel to the lens carrier and to fix the lens elements in the aligned position.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a perspective view of an example camera module 100 that includes an example interlock arrangement 102 for attaching a lens barrel 104 to a lens carrier 106, in accordance with some embodiments. In some embodiments, the camera module 100 may include one or multiple features, components, and/or functionality of embodiments described herein with reference to FIGS. 2-14.

In some embodiments, the lens barrel 104 may hold one or more lens elements 108 (also referred to herein as the "lens 108") that define an optical axis 110. According to various embodiments, the lens barrel 104 may be a threadless lens barrel. Furthermore, the lens carrier 106 may be a threadless lens carrier. For illustrative purposes, FIG. 1 shows the camera module 100 in an exploded view in which the lens barrel 104 is not attached to the lens carrier 106. However, as discussed in further detail herein, the lens barrel 104 may be attached to and/or interlocked with the lens carrier 106 via the interlock arrangement 102. For instance, a drop-and-turn process may be used to interlock the lens barrel 104 with the lens carrier 106 via the interlock arrangement 102, e.g., as described below with reference to FIG. 2. In various embodiments, the interlock arrangement 102 may restrict movement of the lens barrel 104 relative to the lens carrier 106 along at least the optical axis 110 (e.g., in the +z and −z directions). As such, the interlock arrangement 102 may prevent the lens barrel 104 from detaching from the lens carrier 106 under certain circumstances such as a drop event.

According to some embodiments, the interlock arrangement 102 may include one or more grooves 112 and one or more protrusions 114. For example, a groove 112 may be defined by the lens barrel 104 or the lens carrier 106. A protrusion 114 may extend from the lens barrel 104 or the lens carrier 106 to at least partially into the groove 112. In some cases, the protrusion 114 may extend towards the groove 112 in a direction that is orthogonal to the optical axis 110. Furthermore, the groove 112 may be an L-shaped groove formed circumferentially along an outer periphery of the lens barrel 104 or an inner periphery of the lens carrier 106. FIG. 1 shows grooves 112 defined by the lens carrier 106, and protrusions 114 extending from the lens barrel 104 to at least partially into the grooves 112.

In various examples, the interlock arrangement 102 may include an adhesive (e.g., epoxy, glue, etc.). The adhesive may at least partially fill gaps within the interlock arrangement 102 between the lens barrel 104 and the lens carrier 106. According to some embodiments, the interlock arrangement 102 may include one or more recesses 116. For instance, a recess 116 may be defined by the lens barrel 104. The recess 116 may provide an inlet for the adhesive to be introduced to the gaps within the interlock arrangement 102 between the lens barrel 104 and the lens carrier 106. For instance, the adhesive may be dispensed into the interlock arrangement 102 via the recess 116, and the adhesive may travel via capillary effect to at least partially fill gaps within the interlock arrangement 102.

In some instances, at least a first portion of the adhesive may be in compression when force is applied to the lens barrel 104 in a first direction. For example, the first direction may be parallel to the optical axis 110. Additionally, or alternatively, at least a second portion of the adhesive may be in compression when force is applied to the lens barrel 104 in a second direction. For instance, the second direction may be opposite the first direction.

According to some embodiments, the interlock arrangement 102 may include four grooves 112, four protrusions 114, and/or four recesses 116, e.g., as indicated in FIG. 1. In some instances, each of the protrusions 114 may extend from the lens barrel 104 to at least partially into a respective groove 112. In some embodiments, a first pair of protrusions 114 may be located opposite one another with respect to the lens barrel 104, and a second pair of protrusions 114 may be located opposite one another with respect to the lens barrel 104. Furthermore, each recess 116 may be located proximate a respective protrusion 114. For instance, each recess 116 may be located above a respective protrusion 114. It should be understood, however, that in some embodiments the interlock arrangement 102 may include fewer or more grooves 112, protrusions 114, and/or recesses 116, than shown in FIG. 1. It should also be understood that in some embodiments the grooves 112, protrusions 114, and/or recesses 116 may be shaped, positioned, and/or oriented differently than shown in FIG. 1.

Figure 2:
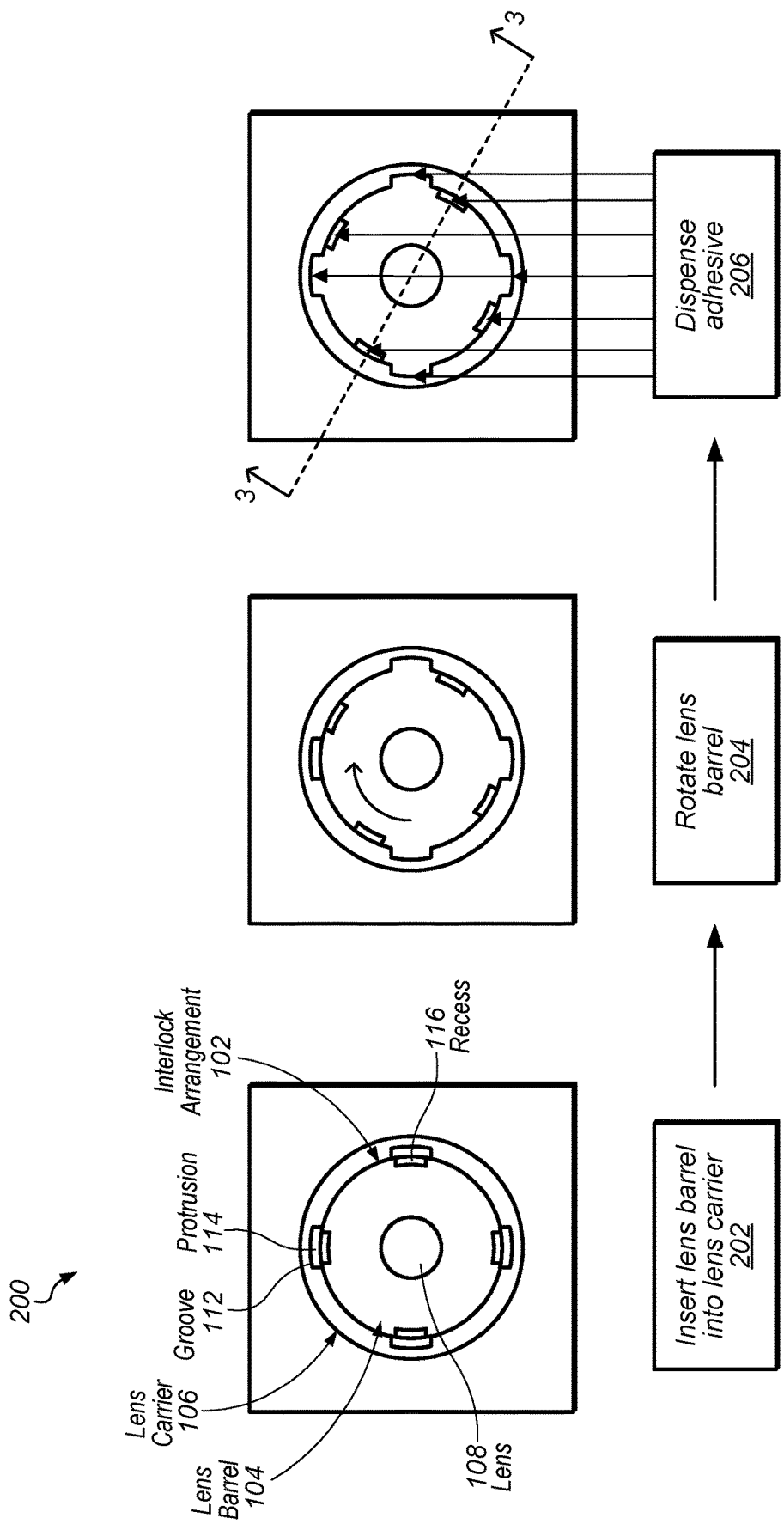
FIG. 2 illustrates a process flow diagram of an example process for attaching a lens barrel to a lens carrier via an interlock arrangement, in accordance with some embodiments.

FIG. 2 illustrates a process flow diagram of an example process 200 for attaching a lens barrel to a lens carrier via an interlock arrangement, in accordance with some embodiments. For clarity, the following discussion with respect to the process 200 of FIG. 2 will also refer to elements of FIG. 1. It should be understood, however, that in some embodiments the process 200 may include one or multiple features, components, and/or functionality of embodiments described herein with reference to FIGS. 1 and 3-14.

At 202, the process 200 may include inserting the lens barrel 104 at least partially into the lens carrier 106. For instance, the lens barrel 104 may be positioned above the lens carrier 106 and inserted into the lens carrier 106 along a path that substantially follows an axis, e.g., the optical axis 110. When inserting the lens barrel 104 into the lens carrier 106, the protrusions 114 may be oriented such that they are each aligned with a respective first portion of a respective groove 112. In some examples, a first portion of a groove 112 may extend in a first direction, e.g., a direction parallel to the optical axis 110. In some embodiments, the groove 112 may be formed on one or more inner surfaces of the lens carrier 106.

At 204, the process 200 may include rotating the lens barrel 104. For example, the lens barrel 104 may be rotated, relative to the lens carrier 106, clockwise or counterclockwise about the optical axis 110. In various embodiments, each of the protrusions 114 may engage a respective groove 112 while the lens barrel 104 is being rotated. For instance, each groove 112 may have a respective second portion that extends in a second direction that is different than the first direction of the respective first portion of the groove 112. In some examples, the second direction may be orthogonal to the first direction. Additionally, or alternatively, the second direction may extend circumferentially along a portion of an inner periphery of the lens carrier 106. According to some embodiments, the respective first portion of the groove 112 and the respective second portion of the groove 112 may together form an L-shaped groove. The L-shaped groove may extend circumferentially along a portion of an inner periphery of the lens carrier 106 in some embodiments.

At 206, the process 200 may include dispensing adhesive into the interlock arrangement 102. For instance, the adhesive may be dispensed into the interlock arrangement 102 at least partially via the recesses 116. In some examples, the adhesive may be dispensed into the recesses 116 such that the adhesive travels to at least partially fill gaps within the interlock arrangement 102 between the lens barrel 104 and the lens carrier 106. Additionally, or alternatively, the adhesive may be dispensed into one or more slots and/or recesses formed by the lens carrier 106. For example, each of the respective first portions of the grooves 112 may form, or be part of, a respective insertion slot through which the lens barrel 104 may be initially inserted into the lens carrier 106. In some instances, the insertion slots may provide inlets for the adhesive to be introduced to gaps within the interlock arrangement 102 between the lens barrel 104 and the lens carrier 106.

Figure 3:
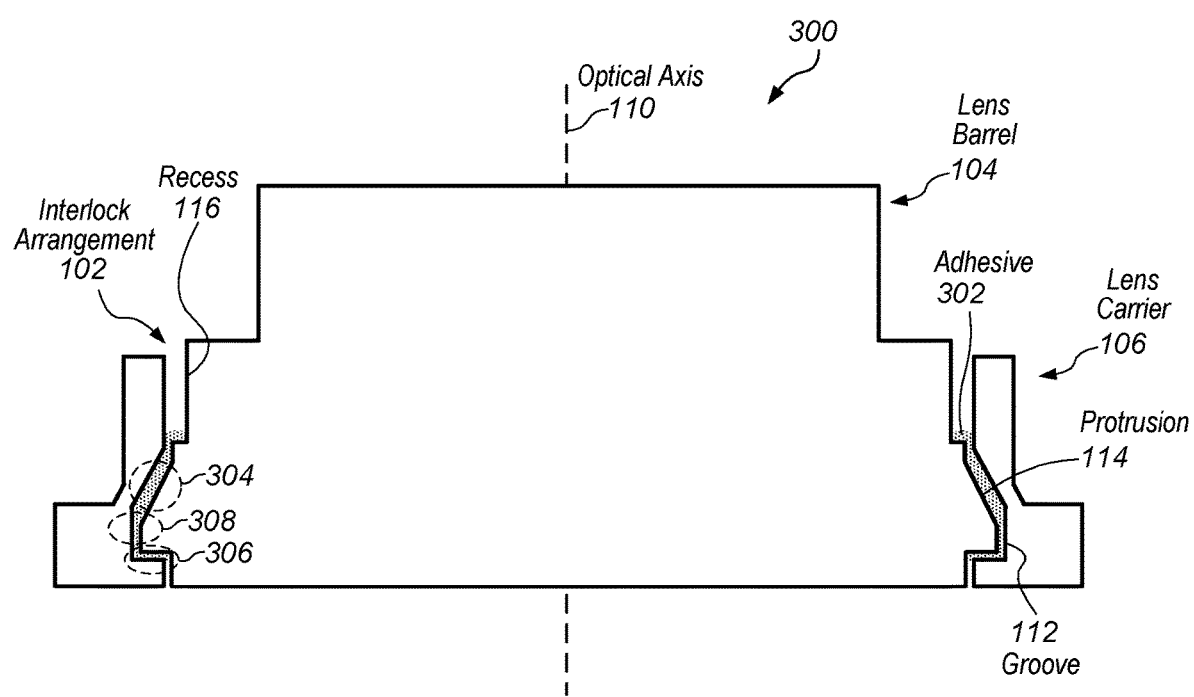
FIG. 3 illustrates a cross-sectional side view of an example camera module that includes an example interlock arrangement, in accordance with some embodiments.

FIG. 3 illustrates a cross-sectional side view of an example camera module 300 that includes an example interlock arrangement, in accordance with some embodiments. For example, the cross-sectional side view of FIG. 3 may correspond to a cross-section taken along section line 3-3 shown in FIG. 2. In some embodiments the camera module 300 may include one or multiple features, components, and/or functionality of embodiments described herein with reference to FIGS. 1, 2, and 4A-14.

In various examples, the camera module 300 may include a lens barrel 104 that is attached to a lens carrier 106 via an interlock arrangement 102. According to some embodiments, the interlock arrangement 102 may include one or more grooves 112, one or more protrusions 114, an adhesive 302 (e.g., epoxy, glue, etc.), and one or more recesses 116. As shown in FIG. 3, the grooves 112 may be defined by the lens carrier 106. Furthermore, the protrusions 114 and the recesses 116 may be defined by the lens barrel 104. Each respective protrusion 114 may extend from the lens barrel 104 to at least partially into a respective groove 112. The protrusions 114 may extend in a direction that is orthogonal to the optical axis 110 in some embodiments. The adhesive 302 may at least partially fill gaps within the interlock arrangement 102 between the lens barrel 104 and the lens carrier 106.

In some instances, one or more forces may be applied to the lens barrel 104 in one or more directions parallel to the optical axis 110. In the case of a drop event, for example, opposite forces may be applied to the lens barrel 104 and the lens carrier 106 upon impact. In some other camera designs, an adhesive used to bond a lens barrel to a lens carrier may be primarily in tension and/or shear, not compression, when forces are applied to the lens barrel in directions parallel to the optical axis. As such, the lens barrel in those other camera designs may tend to detach from the lens carrier as a result of a drop event and/or another situation in which forces are applied to the lens barrel. In contrast, in various embodiments described herein one or more portions of the adhesive 302 may be in compression when force is applied to the lens barrel 104, e.g., in directions parallel to the optical axis 110 (defined by one or more lens elements held by the lens barrel 104). Accordingly, embodiments of the interlock arrangement described herein may be more likely to prevent the barrel 104 from detaching from the lens carrier 106 than the other camera designs (in which the adhesive is primarily in tension and/or shear) in some instances.

In some cases, a first portion 304 of the adhesive 302 may fill a first gap between a protrusion 114 and a groove 112. The first portion 304 may be located proximate an upper surface and/or an upper portion of the protrusion 114. In some embodiments, the first portion 304 may be in compression when force is applied to the lens barrel 104 in a first direction parallel to the optical axis 110 (e.g., the +z direction).

Additionally, or alternatively, a second portion 306 of the adhesive 302 may fill a second gap between the protrusion 114 and the groove 112. The second portion 306 may be located proximate a lower surface and/or a lower portion of the protrusion 114. In some embodiments, the second portion 306 may be in compression when force is applied to the lens barrel 104 in a second direction parallel to the optical axis 110 (e.g., the −z direction).

In some embodiments, a third portion 308 of the adhesive 302 may fill a third gap between the protrusion 114 and the groove 112. The third portion 308 may be located proximate a radial surface and/or a radial portion of the protrusion 114. For instance, the radial surface/portion of the protrusion 114 may extend from the upper surface/portion of the protrusion 114 to the lower surface/portion of the protrusion 114.

In some examples, the third gap (filled by the third portion 308 of the adhesive 302) may be smaller than the first gap (filled by the first portion 304 of the adhesive 302) and/or the second gap (filled by the second portion 306 of the adhesive 302). The first gap and the second gap may be larger than the third gap to accommodate an adjustment of the position of the lens barrel 104 relative to an image sensor (e.g., the image sensor 1124 described below with reference to FIG. 11) in some embodiments. For instance, the position of the lens barrel 104 may be adjusted to orient one or more lens elements in the lens barrel 104 to a focused and/or optically aligned position with the image sensor, e.g., as discussed below with reference to FIG. 10. In some embodiments, an active alignment process may be used to adjust the position of the lens barrel 104 to optically align the lens elements with the image sensor.

In some embodiments, the gaps within the interlock arrangement 102 between the lens barrel 104 and the lens carrier 106 may be sized such that the adhesive 302 may travel from the recesses 116 to at least partially fill the gaps via capillary effect. In some non-limiting examples, one or more of the gaps may have a dimension ranging from about 20 microns to about 200 microns.

Figure 4A:
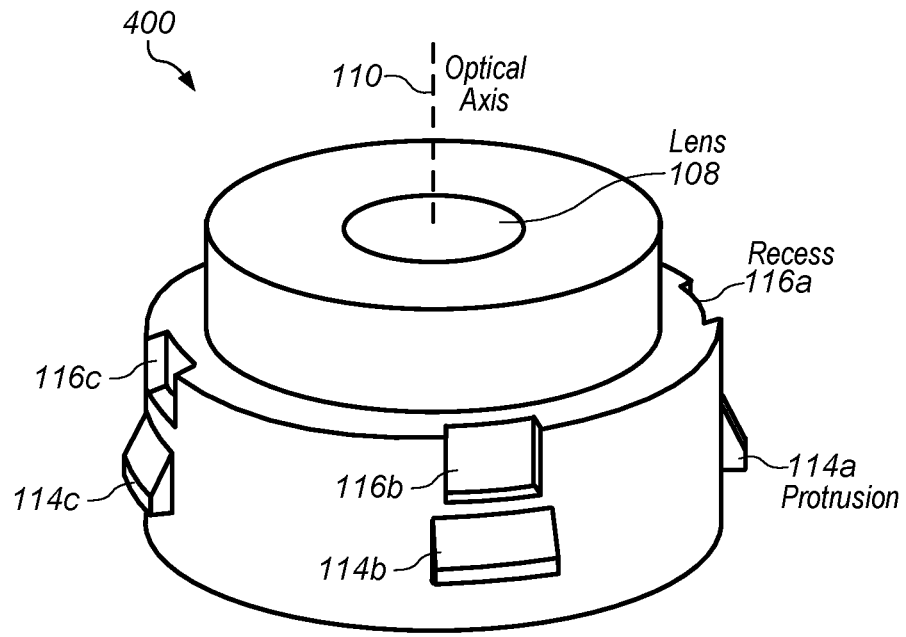
FIGS. 4A-4B each illustrate a respective view of an example lens barrel that includes one or more protrusions of an interlock arrangement, in accordance with some embodiments.
Figure 4B:
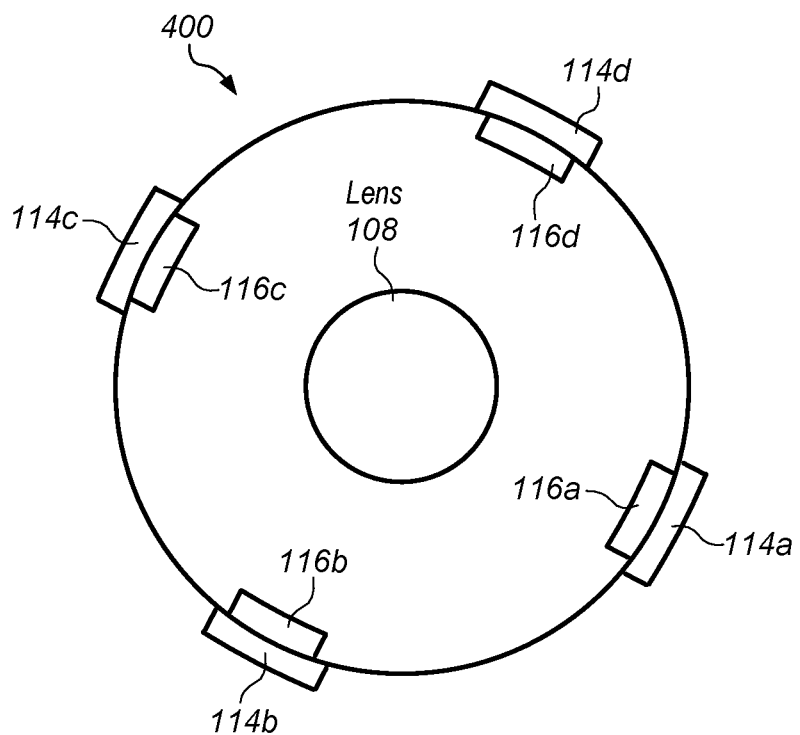

FIGS. 4A-4B each illustrate a respective view of an example lens barrel 400 that includes one or more protrusions of an interlock arrangement, in accordance with some embodiments. FIG. 4A shows a perspective view of the lens barrel 400. FIG. 4B shows a top view of the lens barrel 400. In some embodiments the lens barrel 400 may include one or multiple features, components, and/or functionality of embodiments described herein with reference to FIGS. 1-3 and 5-14.

According to some examples, the lens barrel 400 may define one or more protrusions and/or one or more recesses. For example, as shown in FIGS. 4A-4B, the lens barrel 400 may define a first protrusion 114a, a second protrusion 114b, a third protrusion 114c, and a fourth protrusion 114d. Furthermore, the lens barrel 400 may define a first recess 116a, a second recess 116b, a third recess 116c, and a fourth recess 116d.

In some embodiments, each of the recesses may be located proximate a respective protrusion. The first recess 116a may be located proximate the first protrusion 114a. For example, the first recess 116a may be located above the first protrusion 114a in some embodiments. The second recess 116b may be located proximate the second protrusion 114b. For example, the second recess 116b may be located above the second protrusion 114b in some embodiments. The third recess 116c may be located proximate the third protrusion 114c. For example, the third recess 116c may be located above the third protrusion 114c in some embodiments. The fourth recess 116d may be located proximate the fourth protrusion 114d. For example, the fourth recess 116d may be located above the fourth protrusion 114d in some embodiments.

In some examples, the protrusions 114a-114d may extend from different parts of a face of the lens barrel 104 in different directions. For instance, the first protrusion 114a may extend in a first direction from a first part of a face of the lens barrel 104. The second protrusion 114b may extend in a second direction from a second part of the face of the lens barrel 104. The third protrusion 114c may extend in a third direction from a third part of the face of the lens barrel 104. In some embodiments, the third direction may be opposite the first direction. The fourth protrusion 114d may extend in a third direction from a fourth part of the face of the lens barrel 104. In some embodiments, the fourth direction may be opposite the second direction.

Figure 9:
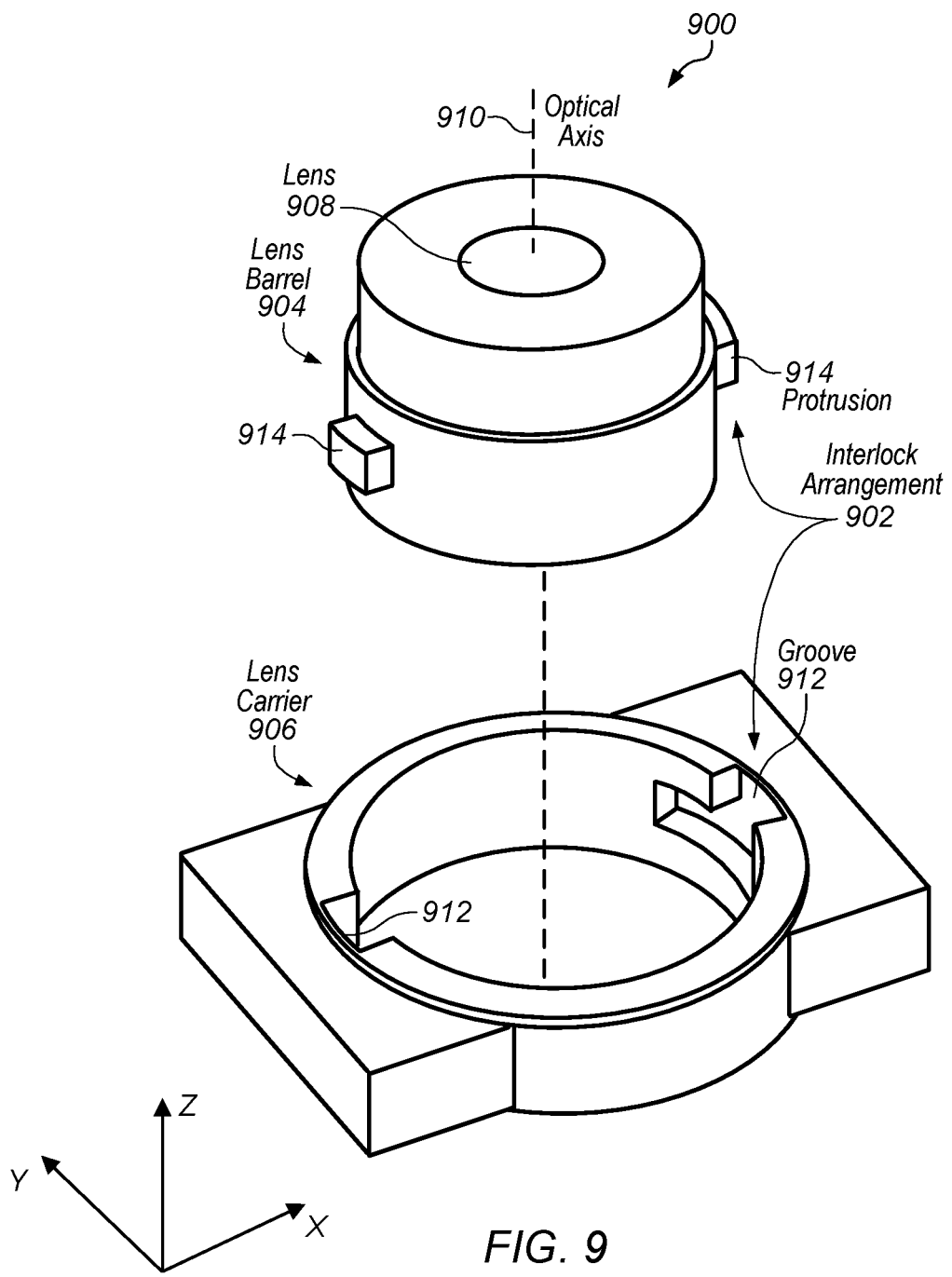
FIG. 9 illustrates a perspective view of an example camera module that includes an example interlock arrangement for attaching a lens barrel to a lens carrier, in accordance with some embodiments.

In some embodiments, one or more of the protrusions 114a-114d may include an angled face. For example, as illustrated in FIG. 4A, each of the protrusions 114a-114d includes a face that is non-parallel with the optical axis 110. The angled face of a protrusion may fit within a groove having a corresponding angle, e.g., as illustrated in FIG. 3. Additionally, or alternatively, one or more of the protrusions 114a-114d may have faces that are parallel to the optical axis 110, e.g., as illustrated in FIG. 9. It should be understood that the protrusions and/or the grooves may have any other shape suitable for the interlock arrangements disclosed herein.

Figure 5:
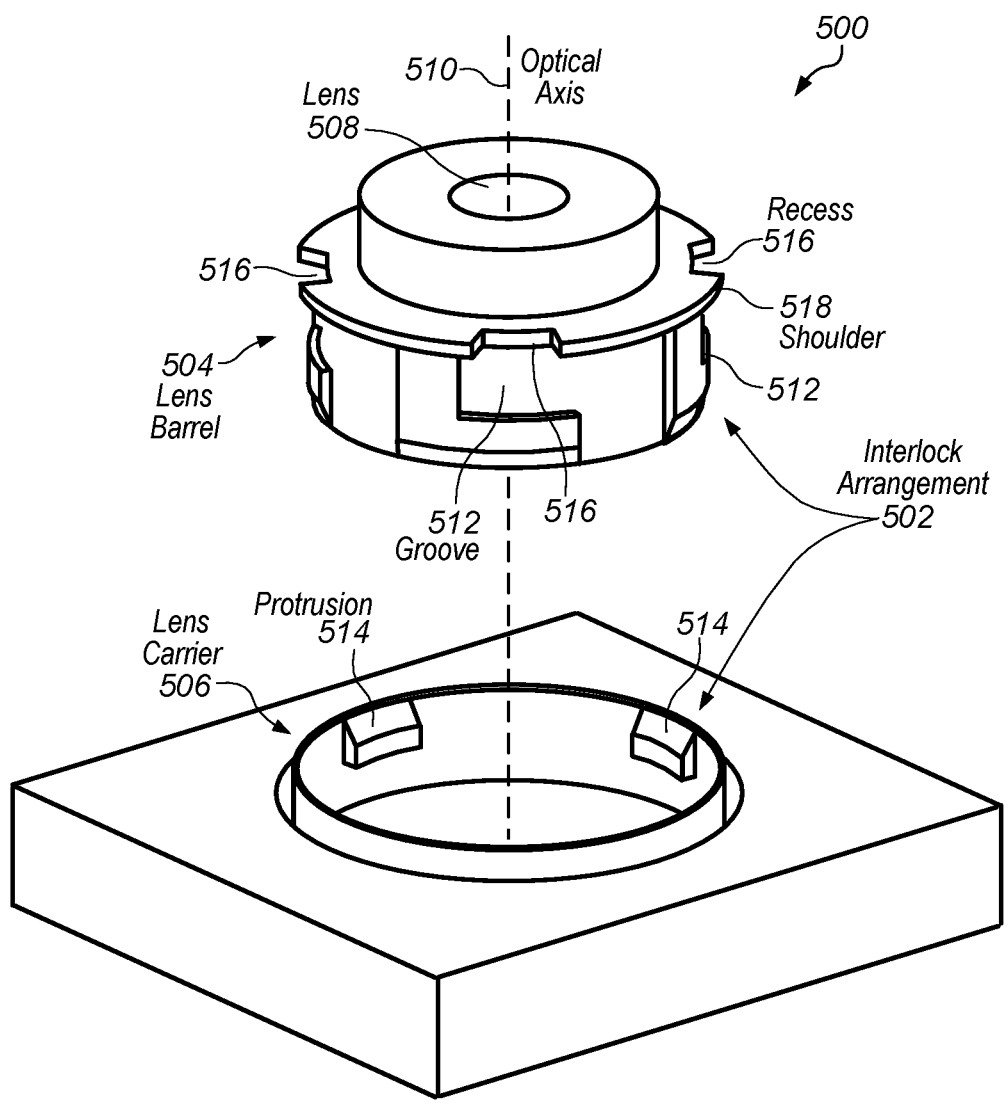
FIG. 5 illustrates a perspective view of an example camera module that includes an example interlock arrangement for attaching a lens barrel to a lens carrier, in accordance with some embodiments.

FIG. 5 illustrates a perspective view of an example camera module 500 that includes an example interlock arrangement 502 for attaching a lens barrel 504 to a lens carrier 506, in accordance with some embodiments. In some embodiments, the camera module 500 may include one or multiple features, components, and/or functionality of embodiments described herein with reference to FIGS. 1-4B and 6-14.

In some embodiments, the lens barrel 504 may hold one or more lens elements 508 (also referred to herein as the "lens 508") that define an optical axis 510. For illustrative purposes, FIG. 5 shows the camera module 500 in an exploded view in which the lens barrel 504 is not attached to the lens carrier 506. However, as discussed in further detail herein, the lens barrel 504 may be attached to and/or interlocked with the lens carrier 506 via the interlock arrangement 502. For instance, a drop-and-turn process may be used to interlock the lens barrel 504 with the lens carrier 506 via the interlock arrangement 502, e.g., as described below with reference to FIG. 6. In various embodiments, the interlock arrangement 502 may restrict movement of the lens barrel 504 relative to the lens carrier 506 along at least the optical axis 510 (e.g., in the +z and −z directions). As such, the interlock arrangement 502 may prevent the lens barrel 504 from detaching from the lens carrier 506 under certain circumstances such as a drop event.

According to some embodiments, the interlock arrangement 502 may include one or more grooves 512 and one or more protrusions 514. For example, a groove 512 may be defined by the lens barrel 504 or the lens carrier 506. A protrusion 514 may extend from the lens barrel 504 or the lens carrier 506 to at least partially into the groove 512. In some cases, the protrusion 514 may extend towards the groove 512 in a direction that is orthogonal to the optical axis 510. Furthermore, the groove 512 may be an L-shaped groove formed circumferentially along an outer periphery of the lens barrel 504 or an inner periphery of the lens carrier 506. FIG. 5 shows grooves 512 defined by the lens barrel 504, and protrusions 514 extending from the lens carrier 506 to at least partially into the grooves 512.

In various examples, the interlock arrangement 502 may include an adhesive (e.g., epoxy, glue, etc.). The adhesive may at least partially fill gaps within the interlock arrangement 502 between the lens barrel 504 and the lens carrier 506. According to some embodiments, the interlock arrangement 502 may include one or more recesses 516. For instance, a recess 516 may be defined by the lens barrel 504. In some cases, the interlock arrangement 502 may include a shoulder 518 that extends from the lens barrel 504, e.g., along a plane orthogonal to the optical axis 510. The shoulder 518 may define the recess 516 in some embodiments. The recess 516 may provide an inlet for the adhesive to be introduced to the gaps within the interlock arrangement 502 between the lens barrel 504 and the lens carrier 506. For instance, the adhesive may be dispensed into the interlock arrangement 502 via the recess 516, and the adhesive may travel via capillary effect to at least partially fill gaps within the interlock arrangement 502.

In some instances, at least a first portion of the adhesive may be in compression when force is applied to the lens barrel 504 in a first direction. For example, the first direction may be parallel to the optical axis 510. Additionally, or alternatively, at least a second portion of the adhesive may be in compression when force is applied to the lens barrel 504 in a second direction. For instance, the second direction may be opposite the first direction.

Figure 6:
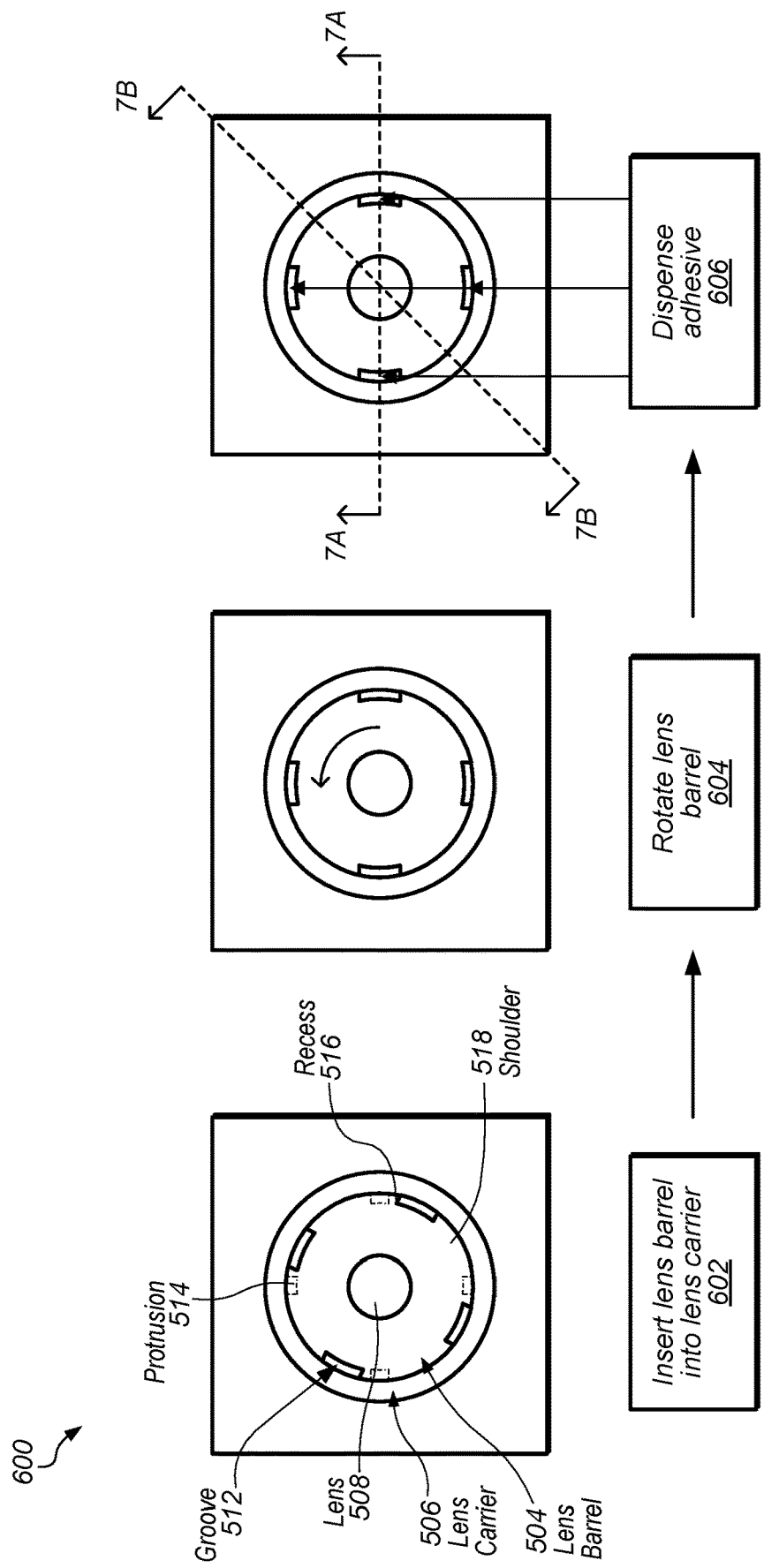
FIG. 6 illustrates a process flow diagram of an example process for attaching a lens barrel to a lens carrier via an interlock arrangement, in accordance with some embodiments.

FIG. 6 illustrates a process flow diagram of an example process 600 for attaching a lens barrel to a lens carrier via an interlock arrangement, in accordance with some embodiments. For clarity, the following discussion with respect to the process 600 of FIG. 6 will also refer to elements of FIG. 5. It should be understood, however, that in some embodiments the process 600 may include one or multiple features, components, and/or functionality of embodiments described herein with reference to FIGS. 1-5 and 7A-14.

At 602, the process 600 may include inserting the lens barrel 504 at least partially into the lens carrier 506. For instance, the lens barrel 504 may be positioned above the lens carrier 506 and inserted into the lens carrier 506 along a path that substantially follows an axis, e.g., the optical axis 510. When inserting the lens barrel 504 into the lens carrier 506, a first portion of a groove 512 may be aligned with a corresponding protrusion 514 of the lens carrier 506. In some examples, the first portion of the groove 512 may extend in a first direction, e.g., a direction parallel to the optical axis 510. In some embodiments, the groove 512 may be formed on one or more outer surfaces of the lens barrel 504.

At 604, the process 600 may include rotating the lens barrel 504. For example, the lens barrel 504 may be rotated, relative to the lens carrier 506, clockwise or counterclockwise about the optical axis 510. In various embodiments, each of the protrusions 514 may engage a respective groove 512 while the lens barrel 504 is being rotated. For instance, each groove 512 may have a second portion that extends in a second direction that is different than the first direction of the first portion of the groove 512. In some examples, the second direction may be orthogonal to the first direction. Additionally, or alternatively, the second direction may extend circumferentially along a portion of an outer periphery of the lens barrel 504. According to some embodiments, the first portion of the groove 512 and the second portion of the groove 512 may together form an L-shaped groove. The L-shaped groove may extend circumferentially along a portion of an outer periphery of the lens barrel 504 in some embodiments.

At 606, the process 600 may include dispensing adhesive into the interlock arrangement 502. For instance, the adhesive may be dispensed into the interlock arrangement 502 at least partially via the recesses 516. In some examples, the adhesive may be dispensed into the recesses 516 such that the adhesive travels to at least partially fill gaps within the interlock arrangement 502 between the lens barrel 504 and the lens carrier 506.

Figure 7A:
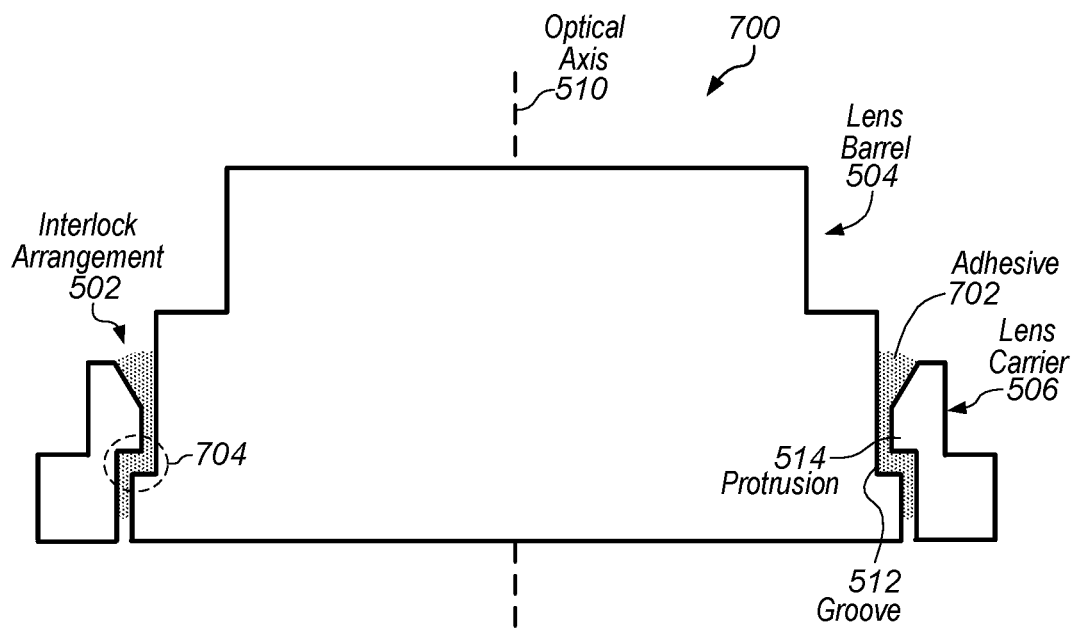
FIGS. 7A-7B each illustrate a respective cross-sectional side view of an example camera module that includes an example interlock arrangement, in accordance with some embodiments.
Figure 7B:
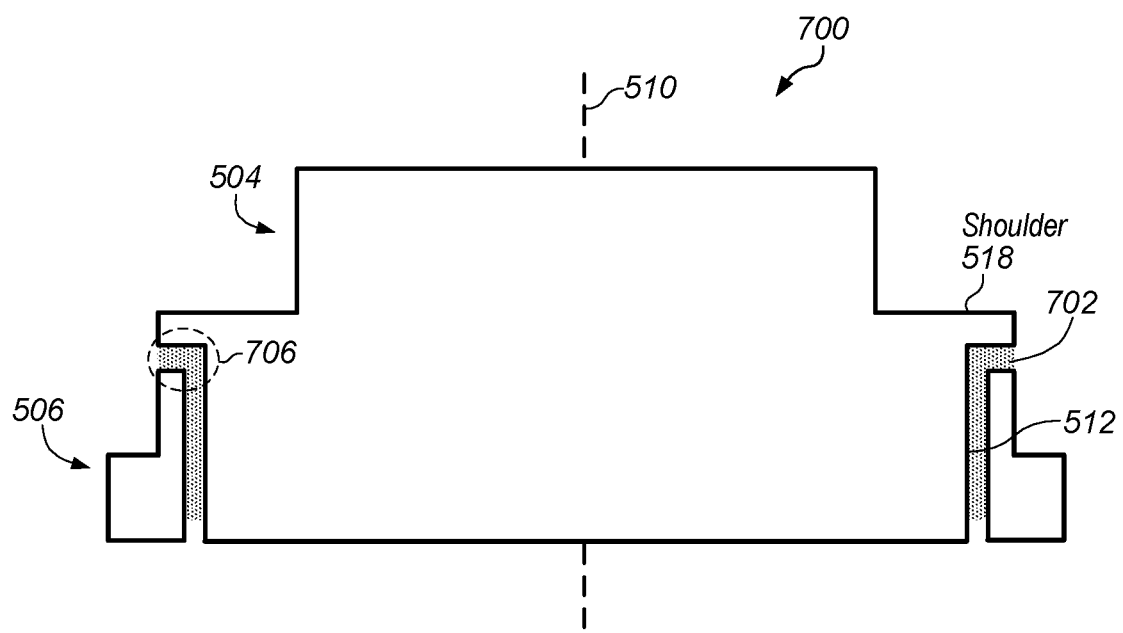

FIGS. 7A-7B each illustrate a respective cross-sectional side view of an example camera module 700 that includes an example interlock arrangement, in accordance with some embodiments. For example, the cross-sectional side views of FIGS. 7A and 7B may correspond to cross-sections taken along section lines 7A-7A and 7B-7B, respectively, shown in FIG. 6. In some embodiments, the camera module 700 may include one or multiple features, components, and/or functionality of embodiments described herein with reference to FIGS. 1-6 and 8A-14.

In various examples, the camera module 700 may include a lens barrel 504 that is attached to a lens carrier 506 via an interlock arrangement 502. According to some embodiments, the interlock arrangement 502 may include one or more grooves 512, one or more protrusions 514, an adhesive 702 (e.g., epoxy, glue, etc.), and one or more recesses 516. As shown in FIG. 7A, the grooves 512 and the recesses 516 may be defined by the lens barrel 504. Furthermore, the protrusions 514 may be defined by the lens carrier 506. Each respective protrusion 514 may extend from the lens carrier 506 to at least partially into a respective groove 512. The protrusions 514 may extend in a direction that is orthogonal to the optical axis 510 in some embodiments. The adhesive 702 may at least partially fill gaps within the interlock arrangement 502 between the lens barrel 504 and the lens carrier 506.

In some instances, one or more forces may be applied to the lens barrel 504 in one or more directions parallel to the optical axis 510. In the case of a drop event, for example, opposite forces may be applied to the lens barrel 504 and the lens carrier 506 upon impact. As shown in FIG. 7A, a first portion 704 of the adhesive 702 may fill a first gap between a protrusion 514 and a groove 512 in some embodiments. The first portion 704 may be located proximate a lower surface and/or a lower portion of the protrusion 514. In some embodiments, the first portion 704 may be in compression when force is applied to the lens barrel 504 in a first direction parallel to the optical axis 510 (e.g., the +z direction).

Additionally, or alternatively, a second portion 706 of the adhesive 702 may fill a second gap between one or more surfaces of the lens carrier 506 and the shoulder 518, e.g., as shown in FIG. 7B. The second portion 706 may be located proximate a lower surface and/or a lower portion of the shoulder 518. In some embodiments, the second portion 706 may be in compression when force is applied to the lens barrel 504 in a second direction parallel to the optical axis 510 (e.g., the −z direction).

In some embodiments, the gaps within the interlock arrangement 502 between the lens barrel 504 and the lens carrier 506 may be sized such that the adhesive 702 may travel from the recesses 516 to at least partially fill the gaps via capillary effect.

Figure 8A:
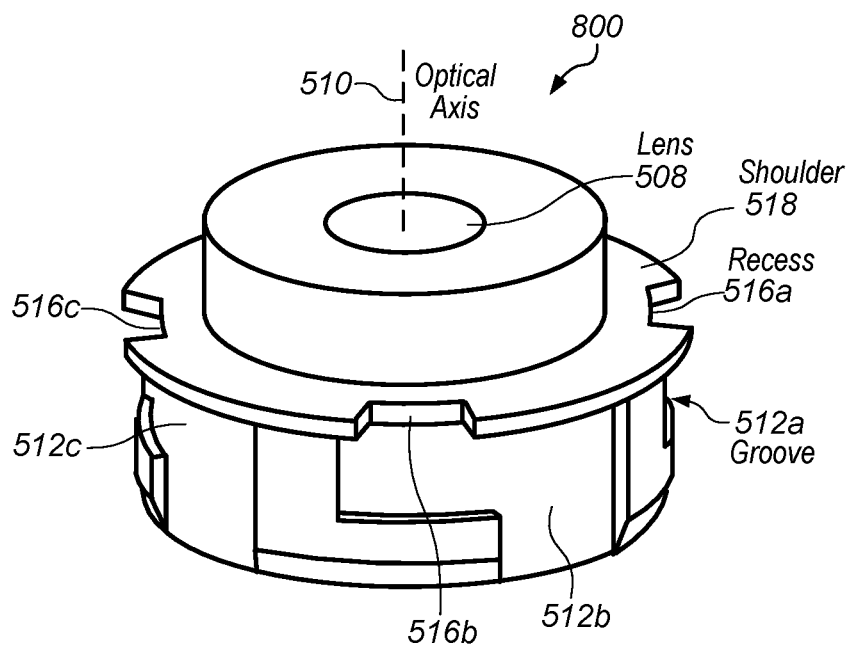
FIGS. 8A-8B each illustrate a respective view of an example lens barrel that includes one or more grooves of an interlock arrangement, in accordance with some embodiments.
Figure 8B:
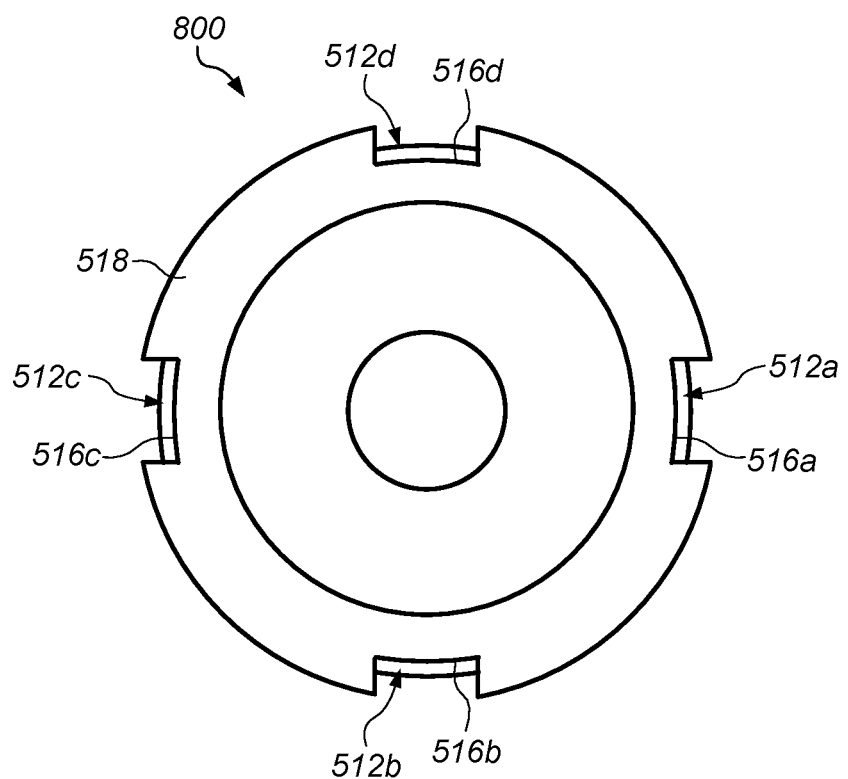

FIGS. 8A-8B each illustrate a respective view of an example lens barrel 800 that includes one or more grooves of an interlock arrangement, in accordance with some embodiments. FIG. 8A shows a perspective view of the lens barrel 800. FIG. 8B shows a top view of the lens barrel 800. In some embodiments, the lens barrel 800 may include one or multiple features, components, and/or functionality of embodiments described herein with reference to FIGS. 1-7B and 9-14.

According to some examples, the lens barrel 800 may define one or more grooves and/or one or more recesses. For example, as shown in FIGS. 8A-8B, the lens barrel 800 may define a first groove 512a, a second groove 512b, a third groove 512c, and a fourth groove 512d. Furthermore, the lens barrel 800 may define a first recess 516a, a second recess 516b, a third recess 516c, and a fourth recess 516d. In some embodiments, the recesses may be formed on a shoulder 518 that extends from the lens barrel, e.g., along a plane orthogonal to the optical axis 510.

In some embodiments, each of the recesses may be located proximate a respective groove. The first recess 516a may be located proximate the first groove 512a. For example, the first recess 516a may be located above the first groove 512a in some embodiments. The second recess 516b may be located proximate the second groove 512b. For example, the second recess 516b may be located above the second groove 512b in some embodiments. The third recess 516c may be located proximate the third groove 512c. For example, the third recess 516c may be located above the third groove 512c in some embodiments. The fourth recess 516d may be located proximate the fourth groove 512d. For example, the fourth recess 516d may be located above the fourth groove 512d in some embodiments.

In some examples, the first groove 512a and the third groove 512c may be opposite one another with respect to the lens barrel 800. Furthermore, the second groove 512b and the fourth groove 512d may be opposite one another with respect to the lens barrel 800 in some cases.

FIG. 9 illustrates a perspective view of an example camera module 900 that includes an example interlock arrangement 902 for attaching a lens barrel 904 to a lens carrier 906, in accordance with some embodiments. In some embodiments, the camera module 900 may include one or multiple features, components, and/or functionality of embodiments described herein with reference to FIGS. 1-8B and 10-14.

In some embodiments, the lens barrel 904 may hold one or more lens elements 908 (also referred to herein as the "lens 908") that define an optical axis 910. For illustrative purposes, FIG. 9 shows the camera module 900 in an exploded view in which the lens barrel 904 is not attached to the lens carrier 906. However, as discussed in further detail herein, the lens barrel 904 may be attached to and/or interlocked with the lens carrier 906 via the interlock arrangement 902. For instance, a drop-and-turn process may be used to interlock the lens barrel 904 with the lens carrier 906 via the interlock arrangement 902, e.g., as described above with reference to FIGS. 2 and 6. In various embodiments, the interlock arrangement 902 may restrict movement of the lens barrel 904 relative to the lens carrier 906 along at least the optical axis 910 (e.g., in the +z and −z directions). As such, the interlock arrangement 902 may prevent the lens barrel 904 from detaching from the lens carrier 906 under certain circumstances such as a drop event.

As shown in FIG. 9, the interlock arrangement 902 may include one or more protrusions 914 that extend along a first axis (e.g., the x-axis) towards one or more grooves 916. The first axis may be orthogonal to the optical axis 910. In this manner, the size of the camera module may be reduced along a second axis (e.g., the y-axis) that is orthogonal to the first axis and/or to the optical axis 910. In some embodiments, one or more of the protrusions 914 may have faces that are parallel to the optical axis 910, e.g., as illustrated in FIG. 9. Additionally, or alternatively, one or more of the protrusions 914 may include an angled face (e.g., a face that is non-parallel with the optical axis 910) that may fit within a groove having a corresponding angle, e.g., as discussed above with reference to FIGS. 4A-4B.

According to some embodiments, the grooves 912 may be defined by the lens barrel 904 and/or the lens carrier 906. The protrusions 914 may extend from the lens barrel 104 and/or the lens carrier 106 to at least partially into the grooves 912. In some cases, each of the protrusions 914 may extend towards a respective groove 912 in direction that is orthogonal to the optical axis 910. In some examples, the grooves 112 may L-shaped grooves formed circumferentially along an outer periphery of the lens barrel 904 and/or an inner periphery of the lens carrier 906. FIG. 9 shows grooves 912 defined by the lens carrier 906, and protrusions 914 extending from the lens barrel 904 to at least partially into the grooves 912.

In various examples, the interlock arrangement 902 may include an adhesive (e.g., epoxy, glue, etc.). The adhesive may at least partially fill gaps within the interlock arrangement 902 between the lens barrel 904 and the lens carrier 906. According to some embodiments, the interlock arrangement 902 may include one or more recesses, e.g., as described herein with reference to FIGS. 1-8 and 10. The recesses may provide an inlet for the adhesive to be introduced to the gaps within the interlock arrangement 902 between the lens barrel 904 and the lens carrier 906.

For instance, a recess 116 may be defined by the lens barrel 104. The recess 116 may provide an inlet for the adhesive to be introduced to the gaps within the interlock arrangement 102 between the lens barrel 104 and the lens carrier 106. For instance, the adhesive may be dispensed into the interlock arrangement 102 via the recess 116, and the adhesive may travel via capillary effect to at least partially fill gaps within the interlock arrangement 102.

According to some embodiments, the interlock arrangement 902 may include two grooves 912 and two protrusions 914, e.g., as indicated in FIG. 9. In some embodiments, a first protrusion 114 and a second protrusion 114 may be located opposite one another with respect to the lens barrel 904. It should be understood, however, that in some embodiments the interlock arrangement 902 may include fewer or more grooves 912 and/or protrusions 914 than shown in FIG. 9. It should also be understood that in some embodiments the grooves 912 and/or protrusions 114 may be shaped, positioned, and/or oriented differently than shown in FIG. 9.

Figure 10:
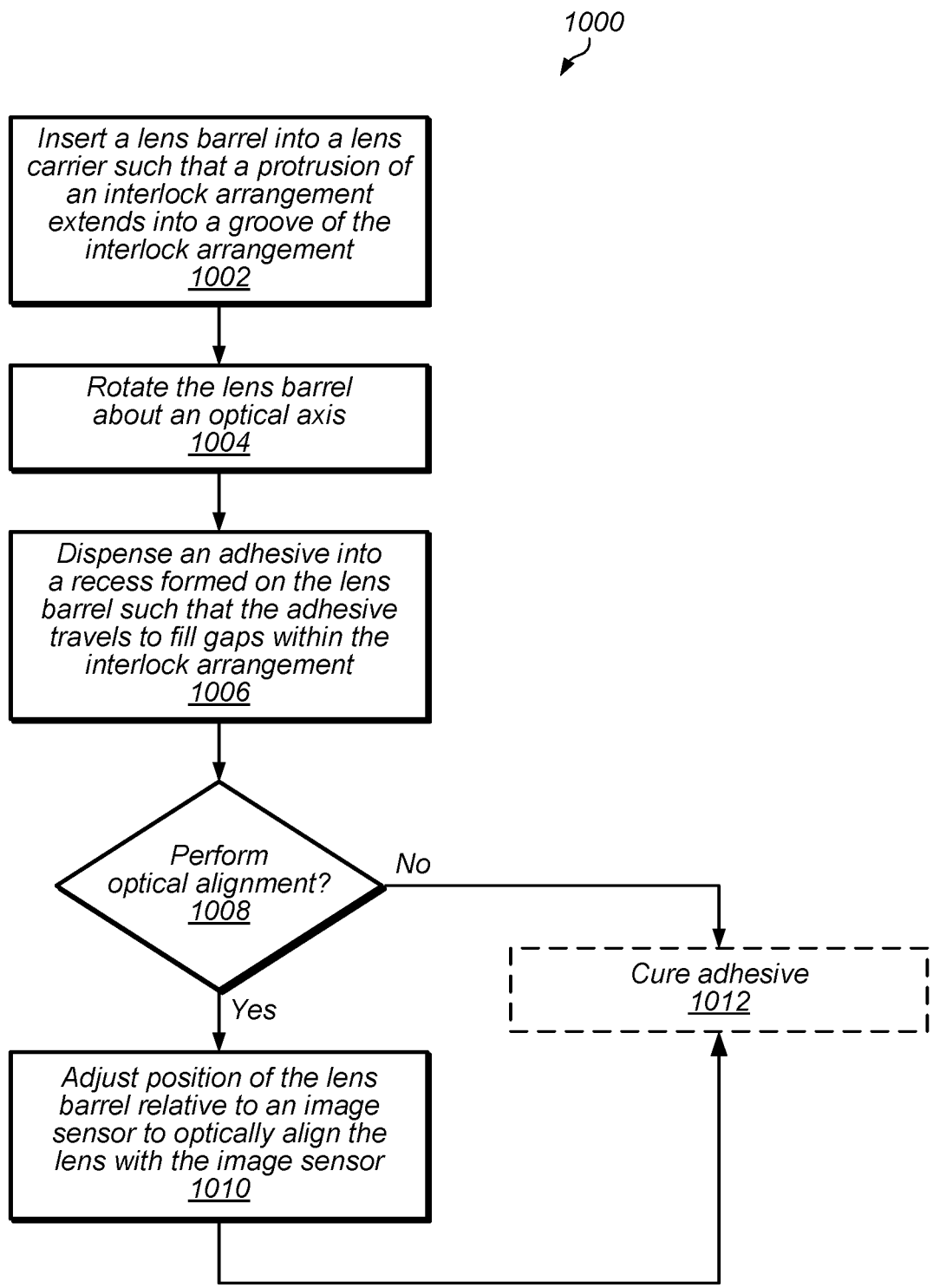
FIG. 10 is a flowchart of an example method of assembling a camera module having an interlock arrangement, in accordance with some embodiments.

FIG. 10 is a flowchart of an example method 1000 of assembling a camera module having an interlock arrangement, in accordance with some embodiments. In some embodiments, the method 1000 may include one or multiple features, components, and/or functionality of embodiments described herein with reference to FIGS. 1-9 and 11-14.

At 1002, the method 1000 may include inserting a lens barrel at least partially into a lens carrier. For example, the lens barrel may be inserted into the lens carrier such that a protrusion of the interlock arrangement extends at least partially into a groove of the interlock arrangement. The protrusion may be defined by the lens barrel or the lens carrier. In various examples, the groove may be defined by the other of the lens barrel or the lens carrier that does not define the protrusion. In some embodiments, the protrusion may be defined by the lens barrel and the groove may be defined by the lens carrier. In some cases, the protrusion may be defined by the lens carrier and the groove may be defined by the lens barrel. According to various embodiments, the interlock arrangement may include multiple protrusions defined by the lens barrel and/or the lens carrier, and multiple grooves defined by the lens barrel and/or the lens carrier.

At 1004, the method 1000 may include rotating the lens barrel about an optical axis. For instance, the lens barrel may be rotated about an optical axis defined by one or more lens elements held by the lens barrel. In some examples, the lens barrel may be rotated clockwise. In other examples, the lens barrel may be rotated counterclockwise.

At 1006, the method 1000 may include dispensing an adhesive (e.g., epoxy, glue, etc.) into a recess formed on the lens barrel. The recess may provide an inlet for the adhesive to be introduced to the interlock arrangement. In some embodiments, the adhesive may be dispensed into the recess such that the adhesive travels to at least partially fill gaps within the interlock arrangement between the lens barrel and the lens carrier.

At 1008, the method 1000 may include determining whether to perform optical alignment (e.g., an active alignment process). If it is determined, at 1008, to perform optical alignment, then the method 1000 may include adjusting a position of the lens barrel relative to an image sensor of the camera module to optically align the lens with the image sensor, at 1010. In some cases, the method 1000 may include curing the adhesive, at 1012. For example, the adhesive may be cured before, during, and/or after performing optical alignment. As another example, the adhesive may be cured during and/or after dispensing the adhesive into the recess, e.g., if it is determined, at 1008, not to perform optical alignment.

Figure 11:
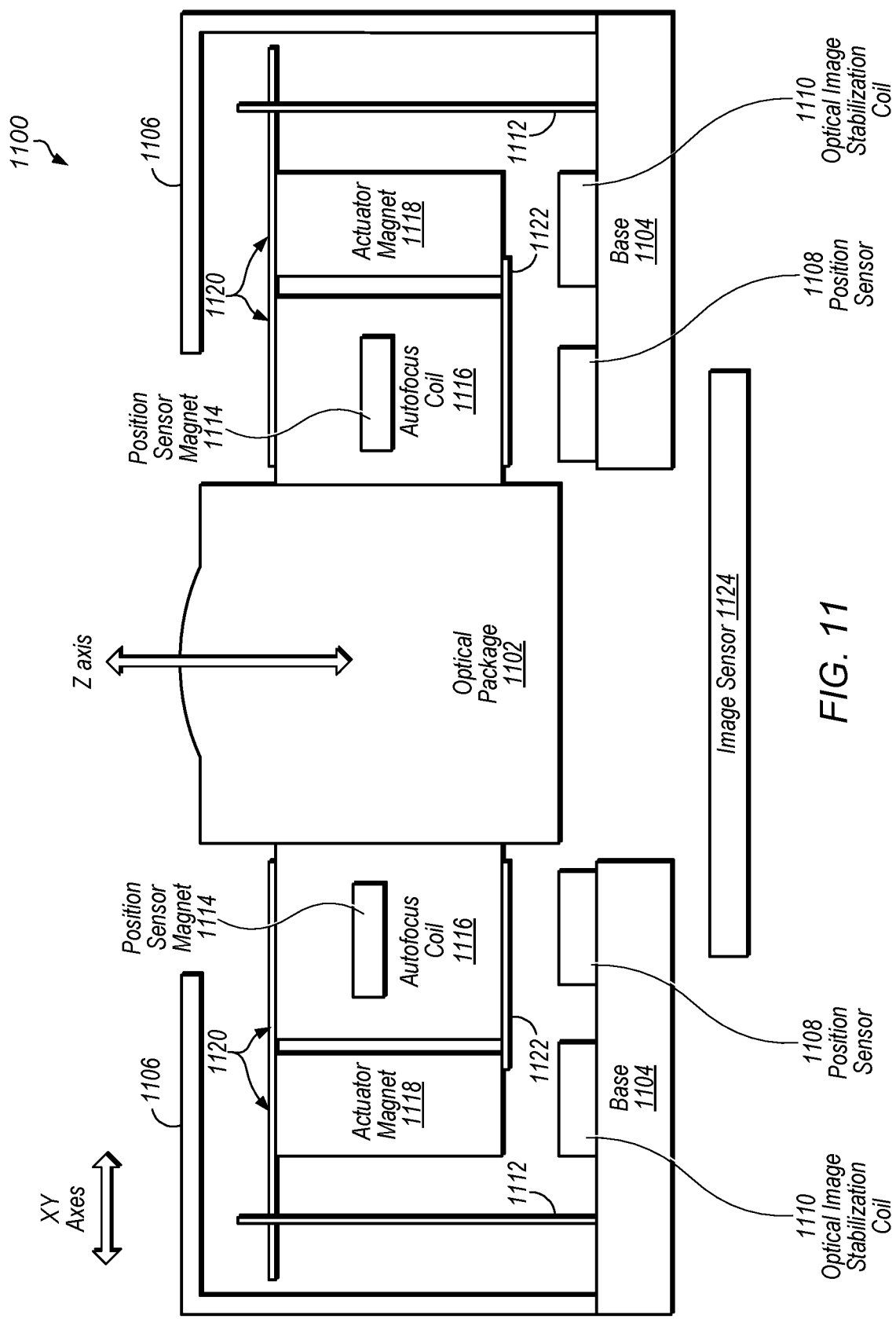
FIG. 11 illustrates a schematic side view of an example camera module having an example voice coil motor (VCM) actuator for moving an optical package that may include an interlock arrangement, in accordance with some embodiments.

FIG. 11 illustrates a schematic side view of an example camera module 1100 having an example voice coil motor (VCM) actuator for moving an optical package 1102 that may include an interlock arrangement, in accordance with some embodiments. In some embodiments, the camera module 1100 may include one or multiple features, components, and/or functionality of embodiments described herein with reference to FIGS. 1-10 and 12-14.

As shown in FIG. 11, the actuator 1100 may include a base or substrate 1104 and a cover 1106. The base 1104 may include and/or support one or more position sensors (e.g., Hall sensors, TMR sensors, GMR sensors, etc.) 1108, one or more optical image stabilization coils 1110, and one or more suspension wires 1112, which may at least partly enable magnetic sensing for autofocus and/or optical image stabilization position detection, e.g., by detecting movements of position sensor magnets 1114.

In some embodiments, the actuator 1100 may include one or more autofocus coils 1116 and one or more actuator magnets 1118, which may at least partly enable autofocus functionality such as moving the optical package 1102 along the z axis and/or along an optical axis defined by one or more lenses of the optical package 1102. In some examples, at least one position sensor magnet 1114 may be disposed proximate to at least one autofocus coil 1116. In some embodiments, at least one position sensor magnet 1114 may be coupled to at least one autofocus coil 1116. For instance, the autofocus coils 1116 may each define a central space that is encircled by the respective autofocus coil 1116. The position sensor magnets 1114 may be disposed within the central spaces encircled by the autofocus coils 1116. Additionally or alternatively, the position sensor magnets 1114 may be attached to support structures (not shown) that are fixed to the autofocus coils 1116. For example, a support structure, to which a position sensor magnet 1114 is attached, may be disposed within a central space encircled by an autofocus coil 1116 and the support structure may be fixed to the autofocus coil 1116.

In some embodiments, the actuator 1100 may include four suspension wires 1112. The optical package 1102 may be suspended with respect to the base 1104 by suspending one or more upper springs 1120 on the suspension wires 1112. In some embodiments, the actuator may include one or more lower springs 1122. In the optical package 1102, an optics component (e.g., one or more lens elements, a lens assembly, etc.) may be screwed, mounted or otherwise held in or by an optics holder. Note that upper spring(s) 1120 and lower spring(s) 1122 may be flexible to allow the optical package 1102 a range of motion along the Z (optical) axis for optical focusing, and suspension wires 1112 may be flexible to allow a range of motion on the x-y plane orthogonal to the optical axis for optical image stabilization. Also note that, while embodiments show the optical package 1102 suspended on wires 1112, other mechanisms may be used to suspend the optical package 1102 in other embodiments.

In various embodiments, the camera module may include an image sensor 1124. The image sensor 1124 may be disposed below the optical package 1102 such that light rays may pass through one or more lens elements of the optical package 1102 (e.g., via an aperture at the top of the optical package 1102) and to the image sensor 1124.

Multifunction Device Examples

Figure 12:
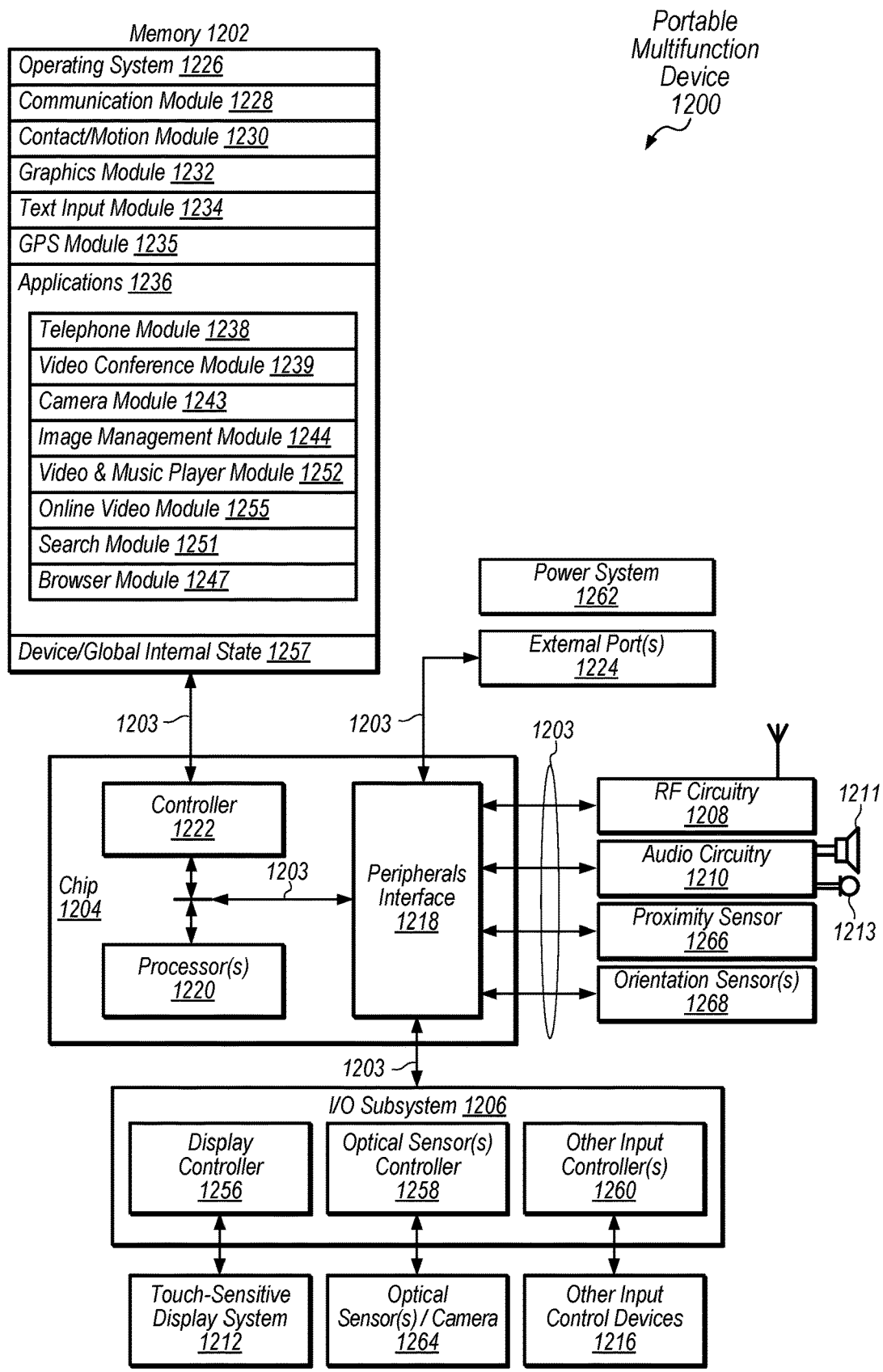
FIG. 12 illustrates a block diagram of a portable multifunction device that may include a camera, in accordance with some embodiments.

FIG. 12 illustrates a block diagram of a portable multifunction device 1200, in accordance with some embodiments. In some embodiments, the portable multifunction device 1200 may include one or multiple features, components, and/or implement functionality of embodiments described herein with reference to FIGS. 1-11, 13, and 14.

In some embodiments, the device 1200 is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device 1200 typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device 1200 may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 1200 may include memory 1202 (which may include one or more computer readable storage mediums), memory controller 1222, one or more processing units (CPU's) 1220, peripherals interface 1218, RF circuitry 1208, audio circuitry 1210, speaker 1211, touch-sensitive display system 1212, microphone 1213, input/output (I/O) subsystem 1206, other input control devices 1216, and external port 1224. Device 1200 may include one or more optical sensors or cameras 1264 (e.g., one or more embodiments of the cameras described herein). These components may communicate over one or more communication buses or signal lines 1203.

It should be appreciated that device 1200 is only one example of a portable multifunction device, and that device 1200 may have more or fewer components than shown, may combine two or more components, or may have a different configuration or arrangement of the components. The various components shown in FIG. 12 may be implemented in hardware, software, or a combination of hardware and software, including one or more signal processing and/or application specific integrated circuits.

Memory 1202 may include high-speed random access memory and may also include non-volatile memory, such as one or more magnetic disk storage devices, flash memory devices, or other non-volatile solid-state memory devices. Access to memory 1202 by other components of device 1200, such as CPU 1220 and the peripherals interface 1218, may be controlled by memory controller 1222.

Peripherals interface 1218 can be used to couple input and output peripherals of the device to CPU 1220 and memory 1202. The one or more processors 1220 run or execute various software programs and/or sets of instructions stored in memory 1202 to perform various functions for device 1200 and to process data.

In some embodiments, peripherals interface 1218, CPU 1220, and memory controller 1222 may be implemented on a single chip, such as chip 1204. In some other embodiments, they may be implemented on separate chips.

RF (radio frequency) circuitry 1208 receives and sends RF signals, also called electromagnetic signals. RF circuitry 1208 converts electrical signals to/from electromagnetic signals and communicates with communications networks and other communications devices via the electromagnetic signals. RF circuitry 1208 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 1208 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1210, speaker 1211, and microphone 1213 provide an audio interface between a user and device 1200. Audio circuitry 1210 receives audio data from peripherals interface 1218, converts the audio data to an electrical signal, and transmits the electrical signal to speaker 1211. Speaker 1211 converts the electrical signal to audible sound waves. Audio circuitry 1210 also receives electrical signals converted by microphone 1213 from sound waves. Audio circuitry 1210 converts the electrical signal to audio data and transmits the audio data to peripherals interface 1218 for processing. Audio data may be retrieved from and/or transmitted to memory 1202 and/or RF circuitry 1208 by peripherals interface 1218. In some embodiments, audio circuitry 1210 also includes a headset jack. The headset jack provides an interface between audio circuitry 1210 and removable audio input/output peripherals, such as output-only headphones or a headset with both output (e.g., a headphone for one or both ears) and input (e.g., a microphone).

I/O subsystem 1206 couples input/output peripherals on device 1200, such as touch screen 1212 and other input control devices 1216, to peripherals interface 1218. I/O subsystem 1206 may include display controller 1256 and one or more input controllers 1260 for other input control devices 1216. The one or more input controllers 1260 receive/send electrical signals from/to other input control devices 1216. The other input control devices 1216 may include physical buttons (e.g., push buttons, rocker buttons, etc.), dials, slider switches, joysticks, click wheels, and so forth. In some alternative embodiments, input controller(s) 1260 may be coupled to any (or none) of the following: a keyboard, infrared port, USB port, and a pointer device such as a mouse. The one or more buttons may include an up/down button for volume control of speaker 1211 and/or microphone 1213. The one or more buttons may include a push button.

Touch-sensitive display 1212 provides an input interface and an output interface between the device and a user. Display controller 1256 receives and/or sends electrical signals from/to touch screen 1212. Touch screen 1212 displays visual output to the user. The visual output may include graphics, text, icons, video, and any combination thereof (collectively termed "graphics"). In some embodiments, some or all of the visual output may correspond to user-interface objects.

Touch screen 1212 has a touch-sensitive surface, sensor or set of sensors that accepts input from the user based on haptic and/or tactile contact. Touch screen 1212 and display controller 1256 (along with any associated modules and/or sets of instructions in memory 1202) detect contact (and any movement or breaking of the contact) on touch screen 1212 and converts the detected contact into interaction with user-interface objects (e.g., one or more soft keys, icons, web pages or images) that are displayed on touch screen 1212. In an example embodiment, a point of contact between touch screen 1212 and the user corresponds to a finger of the user.

Touch screen 1212 may use LCD (liquid crystal display) technology, LPD (light emitting polymer display) technology, or LED (light emitting diode) technology, although other display technologies may be used in other embodiments. Touch screen 1212 and display controller 1256 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1212. In an example embodiment, projected mutual capacitance sensing technology is used, such as that found in the iPhone®, iPod Touch®, and iPad® from Apple Inc. of Cupertino, Calif.

Touch screen 1212 may have a video resolution in excess of 100 dpi. In some embodiments, the touch screen has a video resolution of approximately 160 dpi. The user may make contact with touch screen 1212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 1212, device 1200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1212 or an extension of the touch-sensitive surface formed by the touch screen.

Device 1200 also includes power system 1262 for powering the various components. Power system 1262 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1200 may also include one or more optical sensors or cameras 1264. FIG. 12 shows an optical sensor coupled to optical sensor controller 1258 in I/O subsystem 1206. Optical sensor 1264 may, for example, include charge-coupled device (CCD) or complementary metal-oxide semiconductor (CMOS) phototransistors or photosensors. Optical sensor 1264 receives light from the environment, projected through one or more lenses, and converts the light to data representing an image. In conjunction with imaging module 1243 (also called a camera module), optical sensor 1264 may capture still images and/or video sequences. In some embodiments, at least one optical sensor may be located on the back of device 1200, opposite touch screen display 1212 on the front of the device. In some embodiments, the touch screen display may be used as a viewfinder for still and/or video image acquisition. In some embodiments, at least one optical sensor may instead or also be located on the front of the device.

Device 1200 may also include one or more proximity sensors 1266. FIG. 12 shows proximity sensor 1266 coupled to peripherals interface 1218. Alternatively, proximity sensor 1266 may be coupled to input controller 1260 in I/O subsystem 1206. In some embodiments, the proximity sensor turns off and disables touch screen 1212 when the multifunction device is placed near the user's ear (e.g., when the user is making a phone call).

Device 1200 may also include one or more orientation sensors 1268. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1200. In some embodiments, the one or more orientation sensors include any combination of orientation/rotation sensors. FIG. 12 shows the one or more orientation sensors 1268 coupled to peripherals interface 1218. Alternatively, the one or more orientation sensors 1268 may be coupled to an input controller 1260 in I/O subsystem 1206. In some embodiments, information is displayed on the touch screen display in a portrait view or a landscape view based on an analysis of data received from the one or more orientation sensors.

In some embodiments, device 1200 may also include one or more other sensors (not shown) including but not limited to ambient light sensors and motion detectors. These sensors may be coupled to peripherals interface 1218 or, alternatively, may be coupled to an input controller 1260 in I/O subsystem 1206. For example, in some embodiments, device 1200 may include at least one forward-facing (away from the user) and at least one backward-facing (towards the user) light sensors that may be used to collect ambient lighting metrics from the environment of the device 1200 for use in video and image capture, processing, and display applications.

In some embodiments, the software components stored in memory 1202 include operating system 1226, communication module 1228, contact/motion module (or set of instructions) 1230, graphics module 1232, text input module 1234, Global Positioning System (GPS) module 1235, and applications 1236. Furthermore, in some embodiments memory 1202 stores device/global internal state 1257. Device/global internal state 1257 includes one or more of: active application state, indicating which applications, if any, are currently active; display state, indicating what applications, views or other information occupy various regions of touch screen display 1212; sensor state, including information obtained from the device's various sensors and input control devices 1216; and location information concerning the device's location and/or attitude.

Operating system 1226 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1228 facilitates communication with other devices over one or more external ports 1224 and also includes various software components for handling data received by RF circuitry 1208 and/or external port 1224. External port 1224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 1230 may detect contact with touch screen 1212 (in conjunction with display controller 1256) and other touch sensitive devices (e.g., a touchpad or physical click wheel). Contact/motion module 1230 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1230 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, contact/motion module 1230 and display controller 1256 detect contact on a touchpad.

Contact/motion module 1230 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1232 includes various software components for rendering and displaying graphics on touch screen 1212 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1232 stores data representing graphics to be used. Each graphic may be assigned a corresponding code. Graphics module 1232 receives, from applications etc., one or more codes specifying graphics to be displayed along with, if necessary, coordinate data and other graphic property data, and then generates screen image data to output to display controller 1256.

Text input module 1234, which may be a component of graphics module 1232, provides soft keyboards for entering text in various applications that need text input.

GPS module 1235 determines the location of the device and provides this information for use in various applications (e.g., to telephone module 1238 for use in location-based dialing, to camera module 1243 as picture/video metadata, and to applications that provide location-based services such as map/navigation applications).

Applications 1236 may include one or more of, but are not limited to, the following modules (or sets of instructions), or a subset or superset thereof:

telephone module 1238;
video conferencing module 1239;
camera module 1243 for still and/or video imaging;
image management module 1244;
browser module 1247;
search module 1251;
video and music player module 1252, which may be made up of a video player module and a music player module; and/or
online video module 1255.
one or more other modules not shown, such as a gaming module.

Examples of other applications 1236 that may be stored in memory 1202 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 1208, audio circuitry 1210, speaker 1211, microphone 1213, touch screen 1212, display controller 1256, contact module 1230, graphics module 1232, and text input module 1234, telephone module 1238 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1208, audio circuitry 1210, speaker 1211, microphone 1213, touch screen 1212, display controller 1256, optical sensor 1264, optical sensor controller 1258, contact/motion module 1230, graphics module 1232, text input module 1234, and telephone module 1238, videoconferencing module 1239 includes executable instructions to initiate, conduct, and terminate a video conference between a user and one or more other participants in accordance with user instructions.

In conjunction with touch screen 1212, display controller 1256, optical sensor(s) 1264, optical sensor controller 1258, contact/motion module 1230, graphics module 1232, and image management module 1244, camera module 1243 includes executable instructions to capture still images or video (including a video stream) and store them into memory 1202, modify characteristics of a still image or video, or delete a still image or video from memory 1202.

In conjunction with touch screen 1212, display controller 1256, contact/motion module 1230, graphics module 1232, text input module 1234, and camera module 1243, image management module 1244 includes executable instructions to arrange, modify (e.g., edit), or otherwise manipulate, label, delete, present (e.g., in a digital slide show or album), and store still and/or video images.

In conjunction with RF circuitry 1208, touch screen 1212, display system controller 1256, contact/motion module 1230, graphics module 1232, and text input module 1234, browser module 1247 includes executable instructions to browse the Internet in accordance with user instructions, including searching, linking to, receiving, and displaying web pages or portions thereof, as well as attachments and other files linked to web pages.

In conjunction with touch screen 1212, display system controller 1256, contact/motion module 1230, graphics module 1232, and text input module 1234, search module 1251 includes executable instructions to search for text, music, sound, image, video, and/or other files in memory 1202 that match one or more search criteria (e.g., one or more user-specified search terms) in accordance with user instructions.

In conjunction with touch screen 1212, display system controller 1256, contact/motion module 1230, graphics module 1232, audio circuitry 1210, speaker 1211, RF circuitry 1208, and browser module 1247, video and music player module 1252 includes executable instructions that allow the user to download and play back recorded music and other sound files stored in one or more file formats, such as MP3 or AAC files, and executable instructions to display, present or otherwise play back videos (e.g., on touch screen 1212 or on an external, connected display via external port 1224). In some embodiments, device 1200 may include the functionality of an MP3 player, such as an iPod (trademark of Apple Inc.).

In conjunction with touch screen 1212, display system controller 1256, contact/motion module 1230, graphics module 1232, audio circuitry 1210, speaker 1211, RF circuitry 1208, text input module 1234, and browser module 1247, online video module 1255 includes instructions that allow the user to access, browse, receive (e.g., by streaming and/or download), play back (e.g., on the touch screen or on an external, connected display via external port 1224), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1202 may store a subset of the modules and data structures identified above. Furthermore, memory 1202 may store additional modules and data structures not described above.

In some embodiments, device 1200 is a device where operation of a predefined set of functions on the device is performed exclusively through a touch screen and/or a touchpad. By using a touch screen and/or a touchpad as the primary input control device for operation of device 1200, the number of physical input control devices (such as push buttons, dials, and the like) on device 1200 may be reduced.

The predefined set of functions that may be performed exclusively through a touch screen and/or a touchpad include navigation between user interfaces. In some embodiments, the touchpad, when touched by the user, navigates device 1200 to a main, home, or root menu from any user interface that may be displayed on device 1200. In such embodiments, the touchpad may be referred to as a "menu button." In some other embodiments, the menu button may be a physical push button or other physical input control device instead of a touchpad.

Figure 13:
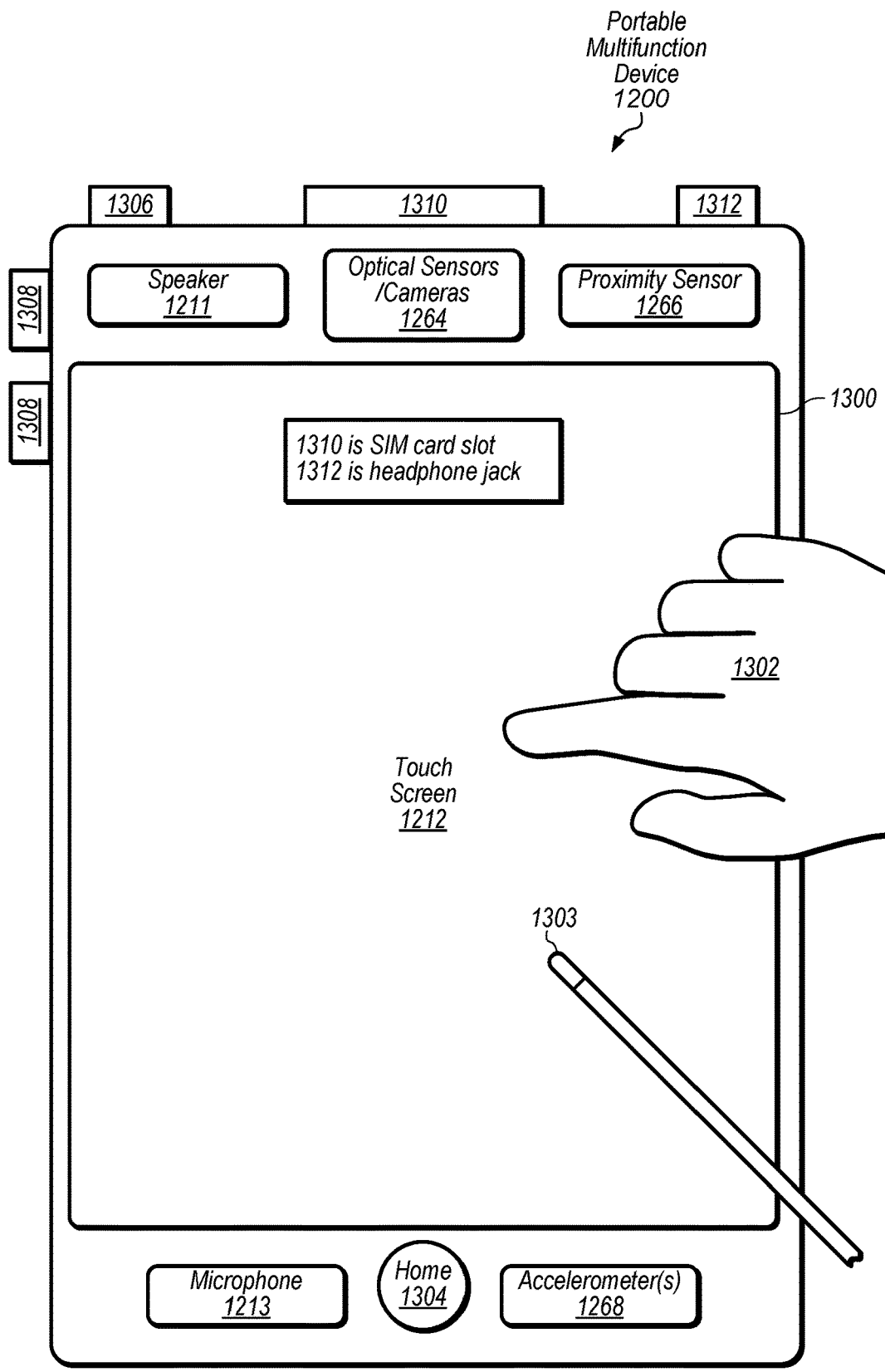
FIG. 13 depicts a portable multifunction device that may include a camera, in accordance with some embodiments.

FIG. 13 depicts illustrates an example portable multifunction device 1200 that may include one or more cameras, in accordance with some embodiments. In some embodiments, the portable multifunction device 1200 may include one or multiple features, components, and/or functionality of embodiments described herein with reference to FIGS. 1-12 and 14.

The device 1200 may have a touch screen 1212. The touch screen 1212 may display one or more graphics within user interface (UI) 1300. In this embodiment, as well as others described below, a user may select one or more of the graphics by making a gesture on the graphics, for example, with one or more fingers 1302 (not drawn to scale in the figure) or one or more styluses 1303 (not drawn to scale in the figure).

Device 1200 may also include one or more physical buttons, such as "home" or menu button 1204. As described previously, menu button 1304 may be used to navigate to any application 1236 in a set of applications that may be executed on device 1200. Alternatively, in some embodiments, the menu button 1304 is implemented as a soft key in a GUI displayed on touch screen 1212.

In one embodiment, device 1200 includes touch screen 1212, menu button 1304, push button 1306 for powering the device on/off and locking the device, volume adjustment button(s) 1308, Subscriber Identity Module (SIM) card slot 1310, head set jack 1312, and docking/charging external port 1224. Push button 1306 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1200 also may accept verbal input for activation or deactivation of some functions through microphone 1213.

It should be noted that, although many of the examples herein are given with reference to optical sensor(s)/camera(s) 1264 (on the front of a device), one or more rear-facing cameras or optical sensors that are pointed opposite from the display may be used instead of, or in addition to, an optical sensor(s)/camera(s) 1264 on the front of a device.

Example Computer System

Figure 14:
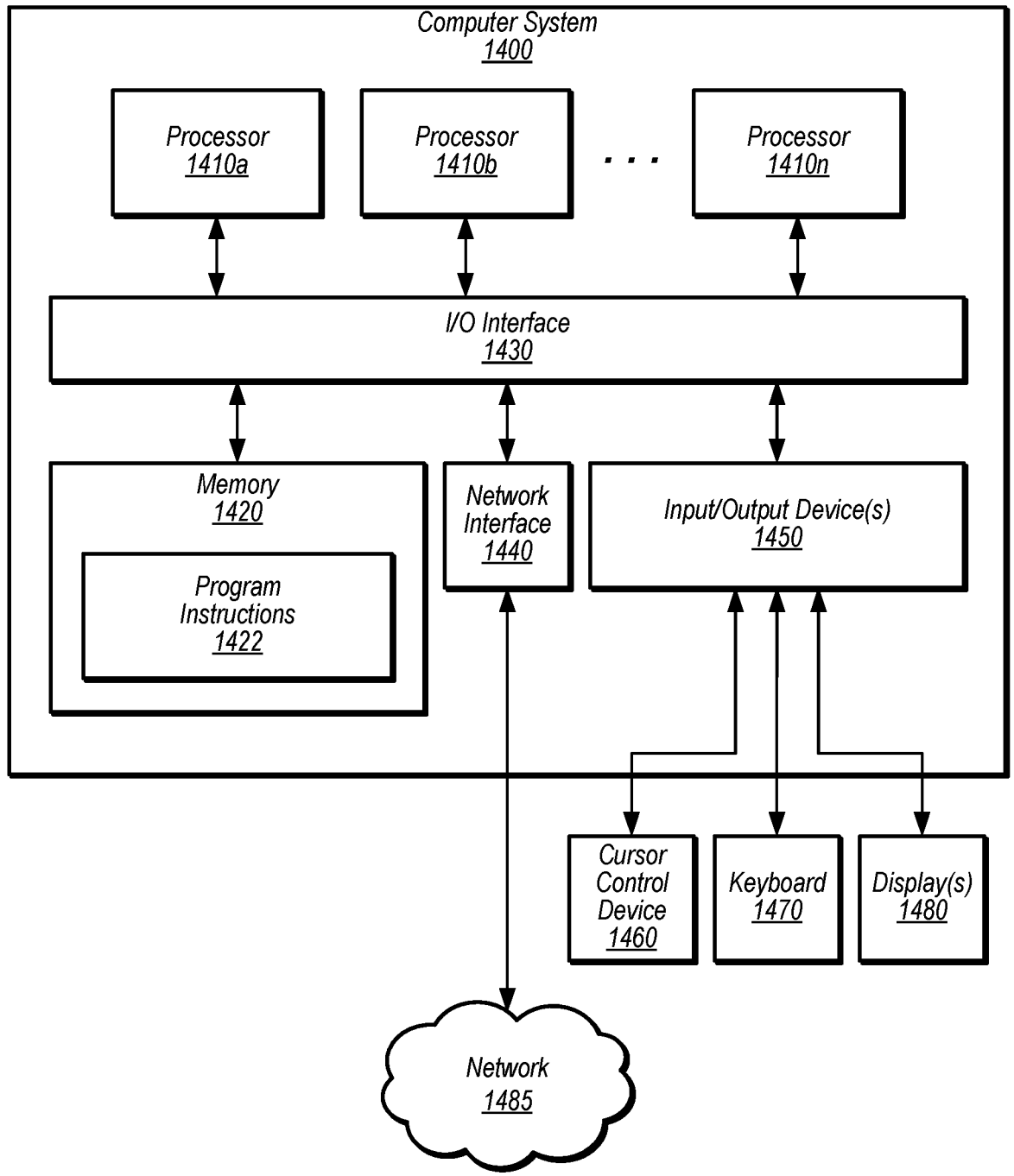
FIG. 14 illustrates an example computer system that may include a camera, in accordance with some embodiments.

FIG. 14 illustrates an example computer system 1400 that may include one or more cameras, in accordance with some embodiments. In some embodiments, the computer system 1400 may include one or multiple features, components, and/or implement functionality of embodiments described herein with reference to FIGS. 1-13.

The computer system 1400 may be configured to execute any or all of the embodiments described above. In different embodiments, computer system 1400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1400, which may interact with various other devices. Note that any component, action, or functionality described above with respect to FIGS. 1-9 may be implemented on one or more computers configured as computer system 1400 of FIG. 14, according to various embodiments. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store program instructions 1422 accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. Additionally, existing camera control data 1432 of memory 1420 may include any of the information or data structures described above. In some embodiments, program instructions and/or data may be received, sent or stored upon different types of computer-accessible media or on similar media separate from system memory 1420 or computer system 1400. While computer system 1400 is described as implementing the functionality of functional blocks of previous figures, any of the functionality described herein may be implemented via such a computer system.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network 1485 (e.g., carrier or agent devices) or between nodes of computer system 1400. Network 1485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or accessing data by one or more computer systems 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1422, which may be processor-executable to implement any element or action described above. In one embodiment, the program instructions may implement the methods described above. In other embodiments, different elements and data may be included. Note that data may include any data or information described above.

Those skilled in the art will appreciate that computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
   a lens barrel to hold one or more lens elements that define an optical axis;
   a lens carrier that attaches to the lens barrel at least partially via a protrusion and groove arrangement that restricts movement of the lens barrel relative to the lens carrier along at least the optical axis;
   wherein the protrusion and groove arrangement includes:
      a plurality of grooves defined by the lens barrel or the lens carrier; and
      a plurality of protrusions that extend from the lens barrel or the lens carrier, wherein respective protrusions of the plurality of protrusions are configured to at least partially insert into respective grooves of the plurality of grooves at distinct locations around a perimeter of the lens barrel or the lens carrier;
   an actuator coil mounted to the lens carrier for moving the lens carrier and lens barrel along the optical axis;
   at least one position sensor magnet attached to and encircled by the actuator coil, wherein the at least one position sensor magnet is for detecting a position of the lens carrier and lens barrel along the optical axis; and
   one or more suspension springs extending in a direction parallel to an axis orthogonal to the optical axis, wherein the one or more suspension springs permit a range of motion of the lens carrier and lens barrel together along the optical axis.

2. The device of claim 1, further comprising:
   an adhesive that at least partially fills gaps within the protrusion and groove arrangement between the lens barrel and the lens carrier; and
   a recess that provides an inlet for the adhesive to be introduced to the gaps within the protrusion and groove arrangement between the lens barrel and the lens carrier;
   wherein the adhesive includes:
      at least a first portion that is in compression between the lens barrel and the lens carrier when force is applied to the lens barrel in a first direction that is parallel to the optical axis; and
      at least a second portion that is in compression between the lens barrel and the lens carrier when force is applied to the lens barrel in a second direction that is opposite the first direction.

3. The device of claim 1, further comprising:
   an adhesive that at least partially fills gaps within the protrusion and groove arrangement between the lens barrel and the lens carrier;

wherein the protrusion and groove arrangement forms a channel between the lens barrel and the lens carrier that is sized such that, when the adhesive is introduced via a recess, the adhesive traverses the channel via capillary effect to at least partially fill the gaps within the protrusion and groove arrangement between the lens barrel and the lens carrier.

4. The device of claim 1, wherein at least one of the grooves is an L-shaped groove formed circumferentially along an outer periphery of the lens barrel or an inner periphery of the lens carrier.

5. The device of claim 1, wherein the plurality of protrusions extends towards the plurality of grooves in directions that are orthogonal to the optical axis.

6. The device of claim 1, wherein:
one of the distinct locations is opposite another one of the distinct locations with respect to the lens barrel.

7. The device of claim 1, wherein:
the device is a mobile multifunction device; and
the device further comprises:
a display;
a camera module, including:
the lens barrel;
the lens carrier;
the protrusion and groove arrangement;
an image sensor configured to capture light passing through the one or more lens elements and covert the captured light into image signals; and
a lens actuator comprising the actuator coil to move the lens carrier relative to the image sensor; and
one or more processors to:
cause the lens actuator to move the lens carrier relative to the image sensor; and
cause the display to present an image based at least in part on one or more of the image signals from the image sensor.

8. A camera module, comprising:
one or more lens elements that define an optical axis; and
a lens barrel that holds the one or more lenses;
a lens carrier; and
a protrusion and groove arrangement to attach the lens barrel to the lens carrier,
wherein the protrusion and groove arrangement comprises:
a plurality of grooves defined by the lens barrel or the lens carrier; and
a plurality of protrusions that extend from the lens barrel or the lens carrier, wherein respective protrusions of the plurality of protrusions are configured to at least partially insert into respective grooves of the plurality of grooves at distinct locations around a perimeter of the lens barrel or the lens carrier;
an actuator coil mounted to the lens carrier for moving the lens carrier and lens barrel along the optical axis;
at least one position sensor magnet attached to and encircled by the actuator coil, wherein the at least one position sensor magnet is for detecting a position of the lens carrier and lens barrel along the optical axis; and
one or more suspension springs extending in a direction parallel to an axis that is orthogonal to the optical axis, wherein the one or more suspension springs permit a range of motion of the lens carrier and lens barrel along the optical axis.

9. The camera module of claim 8, wherein the protrusion and groove arrangement further comprises: one or more recesses, wherein respective recesses of the one or more recesses provides a respective inlet for an adhesive to be introduced to gaps within the protrusion and groove arrangement.

10. The camera module of claim 9, wherein the protrusion and groove arrangement forms one or more channels between the lens barrel and the lens carrier that are sized such that, when the adhesive is introduced via the one or more recesses, the adhesive traverses the one or more channels via capillary effect to at least partially fill the gaps within the protrusion and groove arrangement between the lens barrel and the lens carrier.

11. The camera module of claim 8, further comprising an adhesive that at least partially fills gaps within the protrusion and groove arrangement between the lens barrel and the lens carrier, wherein one or more portions of the adhesive are in compression when force is applied to the lens barrel in directions parallel to the optical axis, wherein the adhesive includes:
at least a first portion that is in compression between the lens barrel and the lens carrier when force is applied to the lens barrel in a first direction that is parallel to the optical axis; and
at least a second portion that is in compression between the lens barrel and the lens carrier when force is applied to the lens barrel in a second direction that is opposite the first direction.

12. The camera module of claim 8, wherein:
the grooves include a first groove defined by the lens carrier;
the protrusions include a first protrusion that extends from the lens barrel to at least partially into the first groove; and
the protrusion and groove arrangement further comprises:
a first recess defined by the lens barrel and located proximate the first protrusion, wherein the first recess provides a first inlet for an adhesive to be introduced to gaps within the protrusion and groove arrangement between surfaces of the first groove and the first protrusion.

13. The camera module of claim 12, wherein:
the grooves further include a second groove defined by the lens carrier;
the protrusions further include a second protrusion that extends from the lens barrel to at least partially into the second groove, the second protrusion opposite the first protrusion with respect to the lens barrel; and
the protrusion and groove arrangement further comprises:
a second recess defined by the lens barrel and located proximate the second protrusion, wherein the second recess provides a second inlet for the adhesive to be introduced to gaps within the protrusion and groove arrangement between surfaces of the second groove and the second protrusion.

14. The camera module of claim 8, wherein:
the grooves include a first groove defined by the lens barrel;
the protrusions include a first protrusion that extends from the lens carrier to at least partially into the first groove; and
the protrusion and groove arrangement further comprises:
a shoulder that extends from the lens barrel along a plane orthogonal to the optical axis;
a first recess defined by the shoulder and located proximate the first groove, wherein the first recess provides a first inlet for an adhesive to be introduced to gaps within the protrusion and groove arrangement between surfaces of the first groove and the first protrusion.

15. The camera module of claim 14, wherein:
the grooves further include a second groove defined by the lens barrel;
the protrusions further include a second protrusion that extends from the lens carrier to at least partially into the second groove, the second protrusion opposite the first protrusion with respect to the lens barrel; and
the protrusion and groove arrangement further comprises:
a second recess defined by the shoulder and located proximate the second groove, wherein the second recess provides a second inlet for the adhesive to be introduced to gaps within the protrusion and groove arrangement between surfaces of the second groove and the second protrusion.

16. A method of assembling a camera module having a protrusion and groove arrangement, the method comprising:
inserting a lens barrel at least partially into a lens carrier such that respective protrusions of a plurality of protrusions of the protrusion and groove arrangement extends from the lens barrel or the lens carrier and at least partially into first portions of respective grooves of a plurality of grooves of the protrusion and groove arrangement, wherein the grooves are defined by the lens barrel or the lens carrier; and
rotating the lens barrel about an optical axis defined by one or more lens elements held by the lens barrel, such that the respective protrusions of the plurality of protrusions extend at least partially into second portions of the respective grooves of the plurality of grooves;
adjusting a position of the lens barrel relative to an image sensor to orient the one or more lens elements in an aligned position in which the one or more lens elements are optically aligned with the image sensor, wherein the adjusting occurs during a time period that occurs after the rotating the lens barrel;
wherein an actuator coil is mounted to the lens carrier for moving the lens carrier and lens barrel along the optical axis; and
wherein one or more suspension springs extending in a direction parallel to an axis that is orthogonal to the optical axis, wherein the one or more suspension springs permit a range of motion of the lens carrier and lens barrel along the optical axis.

17. The method of claim 16, further comprising: dispensing an adhesive into a recess, that provides an inlet for the adhesive to be introduced to the protrusion and groove arrangement, such that the adhesive travels to at least partially fill gaps within the protrusion and groove arrangement between the lens barrel and the lens carrier; and curing the adhesive to bond the lens barrel to the lens carrier and to fix the one or more lens elements in the aligned position.

18. The method of claim 16, further comprising:
dispensing an adhesive into a recess, that provides an inlet for the adhesive to be introduced to the protrusion and groove arrangement, such that the adhesive travels to at least partially fill gaps within the protrusion and groove arrangement between the lens barrel and the lens carrier, wherein:
the dispensing the adhesive into the recess comprises:
filling, with a first portion of the adhesive and via capillary effect, a first gap between a first surface of one of the protrusions and a first surface of a respective one of the grooves; and
the first portion of the adhesive is in compression when force is applied to the lens barrel in at least a first direction that is parallel to the optical axis.

19. The method of claim 18, wherein:
the dispensing the adhesive into the recess further comprises:
filling, with a second portion of the adhesive and via capillary effect, a second gap between the lens barrel and the respective groove; and
the second portion of the adhesive is in compression when force is applied to the lens barrel in at least a second direction that is opposite the first direction.

* * * * *